(12) United States Patent
Raslambekov

(10) Patent No.: US 11,779,445 B2
(45) Date of Patent: *Oct. 10, 2023

(54) SYSTEMS AND METHODS FOR DETERMINING A BITE POSITION BETWEEN TEETH OF A SUBJECT

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,286

(22) Filed: Jun. 20, 2022

(65) Prior Publication Data

US 2022/0361998 A1 Nov. 17, 2022

Related U.S. Application Data

(63) Continuation of application No. 17/319,666, filed on May 13, 2021, now Pat. No. 11,364,103.

(51) Int. Cl.
*G06T 15/00* (2011.01)
*A61C 19/05* (2006.01)
(Continued)

(52) U.S. Cl.
CPC ............ *A61C 19/05* (2013.01); *A61C 9/004* (2013.01); *G06T 17/20* (2013.01); *G06T 19/20* (2013.01); *G06T 2219/2016* (2013.01)

(58) Field of Classification Search
CPC . G06T 19/20; G06T 17/20; G06T 2219/2004; G06T 2219/2016; G06T 2210/41; A61C 9/004; A61C 19/05

(Continued)

(56) References Cited

U.S. PATENT DOCUMENTS 6,152,731 A 11/2000 Jordan et al.
6,979,196 B2 12/2005 Nikolskiy et al.
(Continued)

FOREIGN PATENT DOCUMENTS

DE 102011084111 A1 4/2013
WO 2020037598 A1 2/2020

OTHER PUBLICATIONS

Watanabe M, Hattori Y, Satoh C. Biological and biomechanical perspectives of normal dental occlusion. InInternational Congress Series Sep. 1, 2005 (vol. 1284, pp. 21-27). Elsevier.*

(Continued)

*Primary Examiner* — Phu K Nguyen
(74) *Attorney, Agent, or Firm* — BCF LLP

(57) ABSTRACT

A method and a system for determining a bite position between arch forms of a subject. The method comprises: receiving a 3D model including a first portion and a second portion respectively representative of lower and upper arch forms of the subject; determining, a respective distance value from each point of the first portion to the second portion; determining, for each point of the first portion, a respective weight value, thereby determining a respective weighted distance value; aggregating respective weighted distance values associated with each point of the first portion to determine an aggregate distance value being a remoteness measure between the first portion and the second portion; and determining the bite position based on the aggregate distance value.

20 Claims, 9 Drawing Sheets

(51) Int. Cl.
*A61C 9/00* (2006.01)
*G06T 17/20* (2006.01)
*G06T 19/20* (2011.01)

(58) Field of Classification Search
USPC .......................................................... 345/418
See application file for complete search history.

(56) References Cited

U.S. PATENT DOCUMENTS

| | | |
|---|---|---|
| 7,736,147 B2 | 6/2010 | Kaza et al. |
| 8,896,592 B2 | 11/2014 | Boltunov et al. |
| 9,084,653 B2 | 7/2015 | Jordan et al. |
| 9,256,710 B2 | 2/2016 | Boltunov et al. |
| 9,626,462 B2 | 4/2017 | Somasundaram et al. |
| 9,814,549 B2 | 11/2017 | Lee et al. |
| 9,962,238 B2 | 5/2018 | Boltunov et al. |
| 10,076,391 B2 | 9/2018 | Glinec et al. |
| 10,265,150 B2 | 4/2019 | Hultgren et al. |
| 10,398,539 B2 | 9/2019 | Nilsson |
| 10,492,892 B2 | 12/2019 | Somasundaram et al. |
| 10,529,073 B2 | 1/2020 | Alvarez et al. |
| 10,653,503 B2 | 5/2020 | Boltunov et al. |
| 10,898,299 B2 | 1/2021 | Boltunov et al. |
| 10,945,811 B1 | 3/2021 | Raslambekov |
| 10,993,782 B1 | 5/2021 | Raslambekov |
| 11,191,618 B1 | 12/2021 | Raslambekov et al. |
| 11,191,619 B1* | 12/2021 | Raslambekov ........ A61C 7/002 |
| 11,364,103 B1* | 6/2022 | Raslambekov ......... G06T 19/20 |
| 2002/0094509 A1 | 7/2002 | Durbin et al. |
| 2002/0180760 A1* | 12/2002 | Rubbert ................. G16H 50/50 |
| | | 345/630 |
| 2008/0038684 A1 | 2/2008 | Keating et al. |
| 2008/0057478 A1 | 3/2008 | Choi |
| 2014/0287379 A1* | 9/2014 | Chun .................... A61C 19/05 |
| | | 433/44 |
| 2016/0005237 A1 | 1/2016 | Chen et al. |
| 2022/0304774 A1* | 9/2022 | Wratten, Jr. ............ A61C 7/002 |
| 2023/0035538 A1* | 2/2023 | Marshall .............. A61C 9/0053 |

OTHER PUBLICATIONS

Won-Hyeon et al., "Optimal position of attachment for removable thermoplastic aligner on the lower canine using finite element analysis", Article published on Jul. 29, 2020, Materials.

Alistair R. et al., "Three-dimensional reconstruction of tooth relationships during carnivoran chewing", Article published in Jul. 2008, Palaeontologia Electronica, vol. 11, Issue 2, 10A:11p.

\* cited by examiner

SYSTEMS AND METHODS FOR DETERMINING A BITE POSITION BETWEEN TEETH OF A SUBJECT

CROSS-REFERENCE

The present application is a Continuation of a U.S. patent application Ser. No. 17/319,666 filed on May 13, 2021, entitled "SYSTEMS AND METHODS FOR DETERMINING A BITE POSITION BETWEEN TEETH OF A SUBJECT", the content of which is incorporated herein by reference in its entirety.

FIELD

The present technology relates to systems and methods for determining a bite position of teeth of a subject, such as for planning an orthodontic treatment for a subject.

BACKGROUND

In orthodontics, treatments for achieving alignment of malposed teeth in a subject may include both surgical and non-surgical approaches aimed at causing subject's teeth to move to a desired position thereof, such as that associated with their alignment. Another purpose of the orthodontic treatment may be to attain a desired occlusion between upper teeth and lower teeth of the subject—that is a state where the upper teeth and the lower teeth of the subject are positioned in a predetermined mutual spatial relationship when a mouth of the subject is closed (also referred to as "standard bite" or "normal bite"). For example, the desired occlusion may occur when certain cusps of the upper teeth are received in grooves of the lower teeth of the subject. Another indicator of the desired occlusion can be matching respective midlines of the upper teeth and the lower teeth of the subjects.

Non-surgical interventions may include, for example, applying dental appliances, such as orthodontic aligners, to the subject's teeth. Orthodontic aligners are typically worn over teeth of an arch form in order to exert a force to the subject's teeth to move the teeth to a desired position, such as to align malocclusions. Surgical approaches include various surgical corrections the subject's skull, such as a maxillary impaction surgery and others.

Thus, to ensure safety and efficacy of the orthodontic treatment, planning of the orthodontic treatment may typically include modelling tooth movements of the subject's teeth using 3D models of subject's arch forms. For example, modelling movements of a given tooth may include modelling at least one of (1) movements of the given tooth relative to other teeth (such as the lower teeth) within an associated arch form and (2) movements of the given tooth relative to teeth (such as the upper teeth) of an opposing arch form.

Therefore, for a more accurate modelling of such movements of the given tooth, it may be required to determine, on the 3D models of the subject's arch forms, a bite position of the subject's teeth.

In this regard, the respective 3D models of the subject's arch forms may be generated, using, for example, intra-oral scanning techniques, where, first, each one of the subject's arch forms is scanned independently and further both arch forms are scanned in the bite position thereof. Further, positions of the so scanned respective 3D models of the subject's arch forms may be calibrated, for example, by reference points thereon allowing to register the bite position on the respective 3D models for further modelling of the tooth movements.

However, the so generated 3D models may not accurately reproduce the bite position of the subject's teeth. For example, the intraoral scanning techniques may introduce some digital artefacts which may further result, for example, in the respective 3D models of the arch forms intersecting one another causing inaccuracy of tooth movements modelled based on the so generated respective 3D models of the subject's arch forms, which, as can be appreciated, may affect effectiveness and safety of the orthodontic treatment.

Certain approaches addressing the above-identified technical problem of determining the bite position of the subject's teeth have been proposed in the prior art.

United States Patent Application Publication No.: 2008/038,684-A1 published on Feb. 14, 2020, assigned to 3M Innovative Properties Co., and entitled "Systems and Processes for Computationally Setting Bite Alignment" discloses a computational process for determining the appropriate bite alignment of an individual. The system and processes use digital models of the upper teeth, lower teeth and bite impression of an individual. Those models are fitted together in an appropriate bite alignment. The relative movement of the models are tracked mathematically. An optimization function is then used to determine the best fit between the models.

U.S. Pat. No. 9,084,653-B2 issued on Jul. 21, 2015, assigned to Cadent Ltd 3M Innovative Properties Co, and entitled "Methods for Use in Dental Articulation" discloses a computer implemented method including providing a first set of digital data corresponding to an upper arch image of at least a portion of an upper dental arch of a patient, providing a second set of digital data corresponding to a lower arch image of at least a portion of a lower dental arch of the patient, providing bite alignment data representative of the spatial relationship between the upper dental arch and the lower dental arch of the patient, and aligning the upper and lower arch images relative to one another based on the bite alignment data until an aligned upper and lower arch image is attained. The aligned upper and lower arch images are moved towards each other until a first contact point is detected and at least one of the upper and lower arch images is moved relative to the other in one or more directions to a plurality of positions for determining optimal occlusion position of the lower and upper dental arches.

United States Patent Application Publication No.: 2016/005,237-A1 published on Jan. 7, 2016, assigned to Carestream Health Inc., and entitled "Method and System for Automatically Aligning Models of an Upper Jaw and a Lower Jaw" discloses a method for automatically aligning a model for an upper jaw with a model for a lower jaw, the method including forming models for teeth of the upper jaw and the lower jaw based on images; obtaining a reference bite frame with the teeth in a clenched state; aligning the models for the teeth of the upper jaw and the lower jaw with the reference bite frame, respectively, to determine transform information between the generated models and the reference bite frame; aligning the model for the teeth of the upper jaw with that of the lower jaw based on the determined transform information.

SUMMARY

It is an object of the present technology to ameliorate at least some of the inconveniences present in the prior art.

Developers of the present technology have appreciated that the bite position of the subject's teeth may be determined on the respective 3D models of the subject's arch forms more accurately by using a specific optimization algorithm.

More specifically, the developers have devised methods and systems directed to determining a remoteness measure between the respective 3D models of the subject's arch forms and determining the bite position therebetween by iteratively minimizing the remoteness measure such that a number of overlap occurrences is minimized. As a result, the present methods and systems, via applying one or more transformation rules to a first one of the respective 3D models of the subject's arch forms, may cause displacement thereof relative to a second one of the respective 3D models, thereby determining the bite position therebetween as being the so optimized position of the first 3D model relative to the second 3D model.

Thus, the methods and systems described herein may allow reproducing an anatomically accurate bite position between the subject's teeth, reducing occurrences of intersections between the 3D models of the subject's arch forms. In certain embodiments, the determination of the anatomically accurate bite position may enable manufacturing of orthodontic aligners for applying effective and safe orthodontic treatments for the subject thanks to an increased accuracy of modelling of the tooth movement.

More specifically, in accordance with a first broad aspect of the present technology, there is provided a method of determining a bite position between a lower arch form and an upper arch form of a subject. The method is executable by a processor. The method comprises: receiving, by the processor, a 3D model including a first portion and a second portion, the first portion including points and being representative of a surface of the lower arch form of the subject; the second portion including points and being representative of a surface of the upper arch form of the subject; determining, by the processor, for each point of the first portion of the 3D model, a respective distance value therefrom to the second portion of the 3D model; determining, by the processor, for each point of the first portion of the 3D model, a respective weight value, the respective weight value associated with a given point of the first portion of the 3D model being indicative of a curvature of the first portion of the 3D model thereat; generating, by the processor, for each point of the first portion of the 3D model, based on the respective weight value and the respective distance value associated therewith, a respective weighted distance value; aggregating, by the processor, respective weighted distance values associated with each point of the first portion thereby determining an aggregate distance value, the aggregate distance value being indicative of a remoteness measure of a current position of the first portion of the 3D model from a bite position thereof relative to the second portion of the 3D model; and determining, by the processor, the bite position between the lower arch form and the upper arch form based on the aggregate distance value associated with the first portion of the 3D model; storing, by the processor, data indicative of the bite position in a memory device communicatively coupled with the processor.

In some implementations of the method, the bite position may be represented as occlusal contacts between teeth of the upper arch form and the lower arch form. The occlusal contacts may be mapped onto one or both of the first model and the second model respectively associated with the upper arch form and the lower arch form. By doing so, the bite position may be represented in a form of a heat map, for example. Alternatively, the bite position may be represented as relative positions of the subject's teeth using the first model and the second model of the 3D model.

In some implementations of the method, prior to the determining the respective distance value, the method further comprises identifying, by the processor, for each point of the first portion of the 3D model, a respective initial position relative to the second portion of the 3D model; and the determining the respective distance value is based on the respective initial position.

In some implementations of the method, the determining the bite position further comprises: iteratively minimizing, by the processor, based on one or more transformation rules, the aggregate distance value, thereby causing displacement of the first portion from the current position thereof towards an optimized position thereof such that a number of overlap occurrences between the first portion and the second portion of the 3D model is minimized; and determining, by the processor, the bite position between the lower arch form and the upper arch form of the subject as being the optimized position of the first portion relative to the second portion of the 3D model.

In some implementations of the method, the one or more transformation rules include at least one of a translation transformation and a rotation transformation.

In some implementations of the method, the iteratively minimizing the aggregate distance value includes applying, by the processor, an optimization algorithm.

In some implementations of the method, the optimization algorithm includes at least one of a gradient descent algorithm, a random search algorithm, a genetic algorithm, and a simulated annealing algorithm.

In some implementations of the method, the determining, for each point of the first portion of the 3D model, the respective distance value includes determining, by the processor, a distance field associated with the second portion of the 3D model.

In some implementations of the method, the determining the aggregate distance value is executed in accordance with an equation:

$$f_O = \sum_{n=1}^{N} f_P(n),$$

where $f_P(n)$ is the respective weighted distance value associated with the given point of the first portion of the 3D model.

In some implementations of the method, the determining the respective distance value is executed in accordance with an equation:

$$f_P(n) = D_n W_n,$$

where $D_n$ is the respective distance value from the given point of the first portion to the second portion of the 3D model, and $W_n$ is the respective weight value associated with the given point.

In some implementations of the method: the first portion further includes mesh elements defined by edges joining respective ones of the points of the first portion, and the determining the respective weight value comprises determining an area of a polygon formed by mesh elements of the first portion adjacent to the given point thereof.

In some implementations of the method, the determining the respective weight value is executed in accordance with an equation:

$$W_n = \tfrac{1}{3} A(P_n),$$

where $A(P_n)$ is the area of the polygon formed by the mesh elements of the first portion adjacent to the given point thereof.

In some implementations of the method, the method further comprises: mapping respective distance values from the points of the first portion to the second portion of the 3D model at the bite position thereof on portions of at least one of the first portion and the second portion of the 3D model representative of occlusal surfaces of a respective one of the lower arch form and the upper arch form, thereby generating a depth map representation of the bite position between the lower arch form and the upper arch form; causing, by the processor, display of the depth map representation of the bite position between the lower arch form and the upper arch form on the at least one of the first portion and the second portion.

In some implementations of the method, the method further comprises determining, by the processor, an orthodontic treatment for the subject based on the data indicative of the bite position.

In accordance with a second broad aspect of the present technology, there is provided a method of determining a bite position between a lower arch form and an upper arch form of a subject. The method is executable by a processor. The method comprises: receiving, by the processor, a 3D model including a first portion and a second portion, the first portion including points and being representative of a surface of the lower arch form of the subject; the second portion including points and being representative of a surface of the upper arch form of the subject; determining, by the processor, for each point of the first portion of the 3D model, a respective distance value therefrom to the second portion of the 3D model; aggregating, by the processor, respective distance values associated with each point of the first portion thereby determining an aggregate distance value, the aggregate distance value being indicative of a remoteness measure of a current position of the first portion of the 3D model from a bite position thereof relative to the second portion of the 3D model; iteratively minimizing, by the processor, based on one or more transformation rules, the aggregate distance value, thereby causing displacement of the first portion from the current position thereof towards an optimized position thereof such that a number of overlap occurrences between the first portion and the second portion of the 3D model is minimized; and determining, by the processor, the bite position between the lower arch form and the upper arch form of the subject as being the optimized position of the first portion relative to the second portion of the 3D model; storing, by the processor, data indicative of the bite position in a memory device communicatively coupled with the processor.

In some implementations of the method, prior to the determining the respective distance value, the method further comprises identifying, by the processor, for each point of the first portion of the 3D model, a respective initial position relative to the second portion of the 3D model; and the determining the respective distance value is based on the respective initial position.

In accordance with a third broad aspect of the present technology, there is provided A system for determining a bite position between a lower arch form and an upper arch form of a subject. The system includes: a processor and a memory device storing instructions. The processor, upon executing the instructions, is configured to: receive a 3D model including a first portion and a second portion, the first portion including points and being representative of a surface of the lower arch form of the subject; the second portion including points and being representative of a surface of the upper arch form of the subject; determine, for each point of the first portion of the 3D model, a respective distance value therefrom to the second portion of the 3D model; determine, for each point of the first portion of the 3D model, a respective weight value, the respective weight value associated with a given point of the first portion of the 3D model being indicative of a curvature of the first portion of the 3D model thereat; generate, for each point of the first portion of the 3D model, based on the respective weight value and the respective distance value associated therewith, a respective weighted distance value; aggregate respective weighted distance values associated with each point of the first portion thereby determining an aggregate distance value, the aggregate distance value being indicative of a remoteness measure of a current position of the first portion of the 3D model from a bite position thereof relative to the second portion of the 3D model; and determine the bite position between the lower arch form and the upper arch form based on the aggregate distance value associated with the first portion of the 3D model; store data indicative of the bite position in the memory device.

In some implementations of the system, prior to the determining the respective distance value, the processor is further configured to identify, for each point of the first portion of the 3D model, a respective initial position relative to the second portion of the 3D model; and determine the respective distance value is based on the respective initial position.

In some implementations of the system, to determine the bite position, the processor is further configured to: iteratively minimize, based on one or more transformation rules, the aggregate distance value, thereby causing displacement of the first portion from the current position thereof towards an optimized position thereof such that a number of overlap occurrences between the first portion and the second portion of the 3D model is minimized; and determine the bite position between the lower arch form and the upper arch form of the subject as being the optimized position of the first portion relative to the second portion of the 3D model.

In some implementations of the system, to iteratively minimize the aggregate distance value, the processor is further configured to apply an optimization algorithm.

In some implementations of the system, the processor is configured to determine the aggregate distance value in accordance with an equation:

$$f_O = \sum_{n=1}^{N} f_P(n),$$

where $f_P(n)$ is the respective weighted distance value associated with the given point of the first portion of the 3D model.

In some implementations of the system, the processor is configured to determine the respective distance value in accordance with an equation:

$$f_P(n) = D_n W_n,$$

where $D_n$ is the respective distance value from the given point of the first portion to the second portion of the 3D model, and $W_n$ is the respective weight value associated with the given point.

In some implementations of the system, the first portion further includes mesh elements defined by edges joining respective ones of the points of the first portion, and to determine the respective weight value, the processor is further configured to determine an area of a polygon formed by mesh elements of the first portion adjacent to the given point thereof.

In some implementations of the system, the processor is configured to determine the respective weight value in accordance with an equation:

$$W_n = \frac{1}{3} A(P_n),$$

where $A(P_n)$ is the area of the polygon formed by the mesh elements of the first portion adjacent to the given point thereof.

In the context of the present specification, the term "orthodontic treatment" is broadly referred to as any type of medical intervention aimed at correcting malocclusions associated with the subject's teeth, including surgical and non-surgical manipulations, such as, but not limited to, using aligners. Further, the orthodontic treatment, as referred to herein, may be determined manually by a professional practitioner in the field of dentistry (such as an orthodontist, a maxillofacial surgeon, for example), automatically by a specific software, and/or a combination of manual and automatic, based on image data and input parameters associated with the subject.

Also, as used herein, determining the orthodontic treatment may include verification of an already determined orthodontic treatment, for example, by modelling an effect of the determined orthodontic treatment using respective 3D representations (such as 3D meshes) of the subject's teeth. The verification may be conducted, for example, to ensure safety and effectiveness of the determined orthodontic treatment for the subject.

Further, in the context of the present specification, the term "point cloud 3D representation" of an object (such as a subject's arch form) refers to an image thereof, for example, in a three-dimensional space, comprising a plurality of data points, each of which is defined by a respective set of coordinates (x, y, z), thereby representing a surface of the object. In one example, the point cloud 3D representation of the object may be generated by an imaging device such as a 3D laser scanner, where each laser scan corresponds to a respective data point. Further, the laser scans can be merged, or otherwise registered relative to each other, generating the point cloud 3D representation.

In the context of the present specification, a "bite position" of subject's teeth denotes a relative position of the subject's teeth in the upper and lower arch forms, when the patient brings the teeth of the upper and lower arch forms together in an unforced, natural, manner In another example, the point cloud 3D representation of the object may be generated by converting a series of 2D images (or a panoramic video) thereof taken from different angles using, for example, specific software.

In yet another example, the point cloud 3D representation may be generated from a respective mesh 3D representation of the object by omitting data of edges defining mesh elements within the respective 3D mesh model and preserving only data of vertices thereof.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
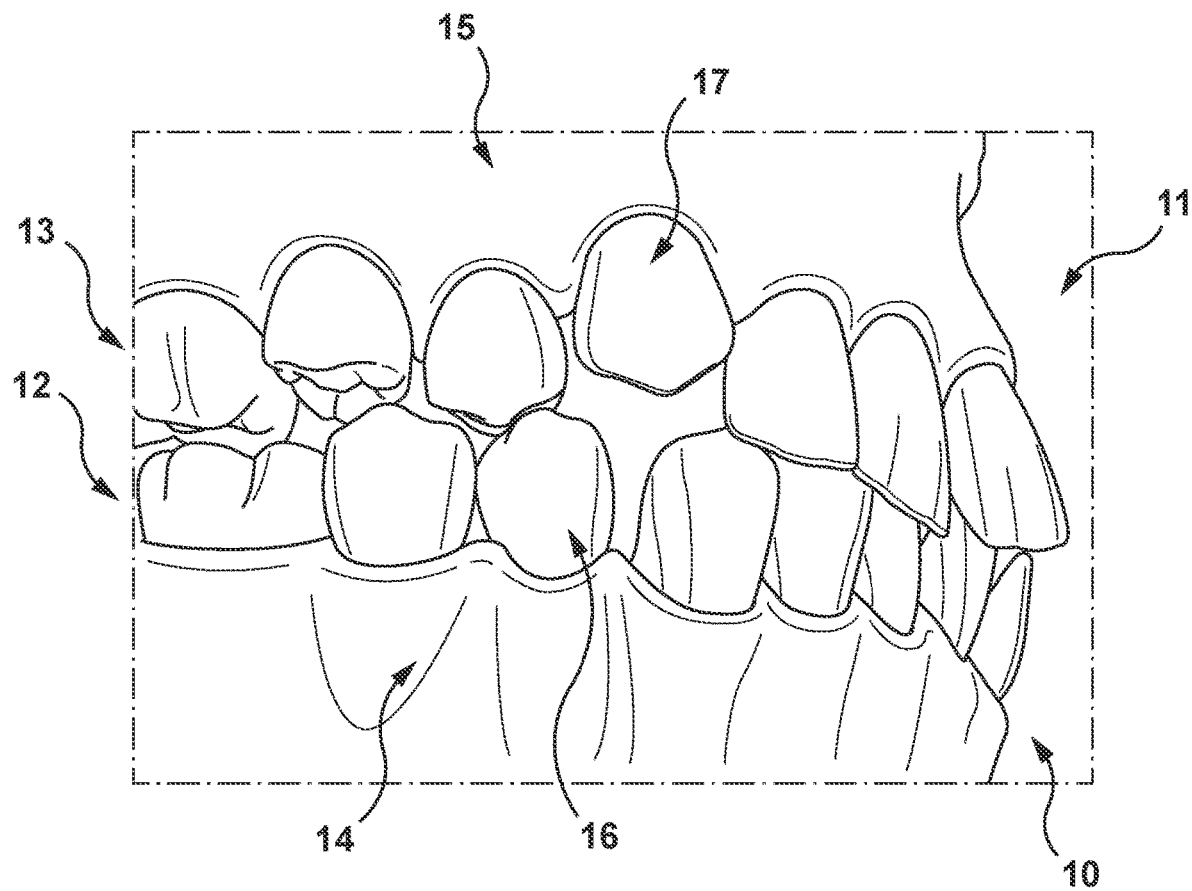
FIG. 1 depicts a perspective view of a lower arch form of a subject depicting examples of malocclusions of some of subject's teeth, in accordance with certain non-limiting embodiments of the present technology.

It should be noted that, unless otherwise explicitly specified herein, the drawings are not to scale.

DETAILED DESCRIPTION

Certain aspects and embodiments of the present technology are directed to methods of and systems for manufacturing an orthodontic appliance based on an orthodontic treatment determined using a bite position of the subject's teeth, the bite position having been determined as described and claimed herein.

More specifically, certain aspects and embodiments of the present technology comprise a computer-implemented method of determining the bite position of upper teeth and lower teeth of the subject based on 3D representations thereof, and further, based on the so determined bite position, modelling tooth movements of the subject's teeth to determine the orthodontic treatment for the subject.

Certain embodiments of the present technology minimize, reduce or avoid some of the problems noted with the prior art. For example, by implementing certain embodiments of the present technology, a closer reproduction of an anatomical bite of the subject may be determined by minimizing a number of overlap occurrences between the 3D representations of the subject's upper and lower teeth. Thus, methods and systems provided herein, according to certain non-limiting embodiments of the present technology, allow more accurately modelling, based on the so determined bite position, the tooth movements of the subject's teeth in the course of the orthodontic treatment, thereby further allowing increasing its safety and efficacy.

For example, increasing safety of the orthodontic treatment (such as applying one or more orthodontic appliances, for example, aligners), may be achieved by a more accurate planning thereof, that is, based on the 3D representations of the subject's teeth that are disposed in a position closely reproducing an actual bite position of the subject's teeth. More specifically, modelling the tooth movements of the subject's teeth in the course of the planned orthodontic treatment based on such a position of the 3D representations of the subject's teeth may allow preventing or reducing chances of collisions between the subject's upper and lower teeth, which may further cause damage thereto, for example, chips or cracks of the tooth enamel of the affected ones of the subject's teeth and/or surrounding tissues including, without limitation, a subject's gingiva, periodontal ligament of one of the affected teeth, or an associated bone thereof. Further, preventing the damage to the subject's teeth may further allow improving comfort of use of the orthodontic appliances by the subject, which may include, without limitation, avoiding pain, irritating sensations, and esthetic discomfort from the orthodontic appliances. In some cases, it should be noted, correction of a bite (malocclusion) could be aesthetic or could be performed for medical considerations, such as to aid in treatment or prevention of medical conditions including but not limited to temporomandibular joint (TMJ) disorders, sleep apnea, and gum damage.

Further, increasing efficiency of the orthodontic treatment, for example, by reducing an overall duration thereof while incorporating safety considerations, may be achieved by analyzing and manufacturing the orthodontic appliances (such as aligners) based on the actual bite position of the subject's teeth such that the form, thickness, and other aspects of the orthodontic appliances are more closely aligned with the actual bite position of the subject's teeth. In this way, the present technology can aid in balancing the considerations of preventing damage while minimizing time of the orthodontic treatment.

Orthodontic Treatment

With initial reference to FIG. 1, there is depicted a perspective view of a lower arch form 10 and an upper arch form 11 of the subject (not depicted), to which certain aspects and non-limiting embodiments of the present technology may be applied.

As can be appreciated, the lower arch form 10 includes lower teeth 12 and a lower gingiva 14; and the upper arch form 11 includes upper teeth 13 and upper gingiva 15. Further, in the depicted embodiments of FIG. 1, positions of at least some of the lower teeth 12 within the lower arch form 10 and those of the upper teeth 13 within the upper arch form 11 may be indicative of certain orthodontic disorders of the subject. For example, at least a given lower tooth 16 and a given upper tooth 17 are misaligned within a respective one of the lower arch form 10 and the upper arch form 11. Further, as the given lower tooth 16 is abnormally embedded within the lower teeth 12 while the given upper teeth 13 abnormally protrudes over opposing ones of the lower teeth 12, the misalignment thereof may affect the bite of the teeth, or, in other words, cause a malocclusion—that is, an irregular spatial relationship—between the lower teeth 12 and the upper teeth 13.

Other malocclusions (not depicted) associated with misalignment of lower teeth 12 relative to each other and the upper teeth 13, according to certain non-limiting embodiments of the present technology, may include, without limitation: overbites, underbites, crossbites, openbites, crowding of some of the lower teeth 12 and the upper teeth 13, midline shift therebetween, and others.

In some non-limiting embodiments of the present technology, for resolving the above-mentioned malocclusions, an orthodontic treatment may be provided to the subject.

In some non-limiting embodiments of the present technology, the orthodontic treatment may comprise applying an orthodontic appliance to the teeth of the subject. Generally speaking, the orthodontic appliance may be configured to exert a respective predetermined force onto at least some of the lower teeth 12 and the upper teeth 13—such as the given lower tooth 16 and the given upper tooth 17, causing them to move towards an aligned position, thereby restoring the normal occlusion of the lower teeth 12 relative to upper teeth 13 of the subject. More specifically, in the depicted embodiments of FIG. 1, the orthodontic appliance may be configured to cause the given lower tooth 16 to move outwardly between lower teeth adjacent thereto; and further cause clockwise rotation thereof. Further, the orthodontic appliance may be configured to cause the given upper tooth 17 to move inwardly. In various non-limiting embodiments of the present technology, the orthodontic appliance may comprise orthodontic appliances of different types, shapes, sizes and configurations, such as those including, without limitation, aligners, brackets, multi-strand wires, strips, retainers, and plates.

In some non-limiting embodiments of the present technology, the orthodontic appliance may be selected, in the course of the orthodontic treatment to correct a respective malocclusion. For example, in some non-limiting embodiments of the present technology, the orthodontic appliance may include a biteplate (not depicted) used for correcting the overbites. More specifically, the biteplate may be configured for preventing front ones of upper teeth 13 overlap front ones of the lower teeth 12 for extended periods of time.

Further, in some non-limiting embodiments of the present technology, the orthodontic appliance may include a bitesplint (not depicted), which may be applied to the lower teeth 12 for correcting the crossbites—a lateral misalignment of one of the lower arch form 10 and the upper arch form 11 resulting, for example, in buccal surfaces of some of the upper teeth 13 overlapping lingual surfaces of opposing ones thereof of the lower teeth 12. To that end, the bitesplint may be configured for preventing the subject from biting completely, which may further allow correcting the crossbites.

Figure 2:
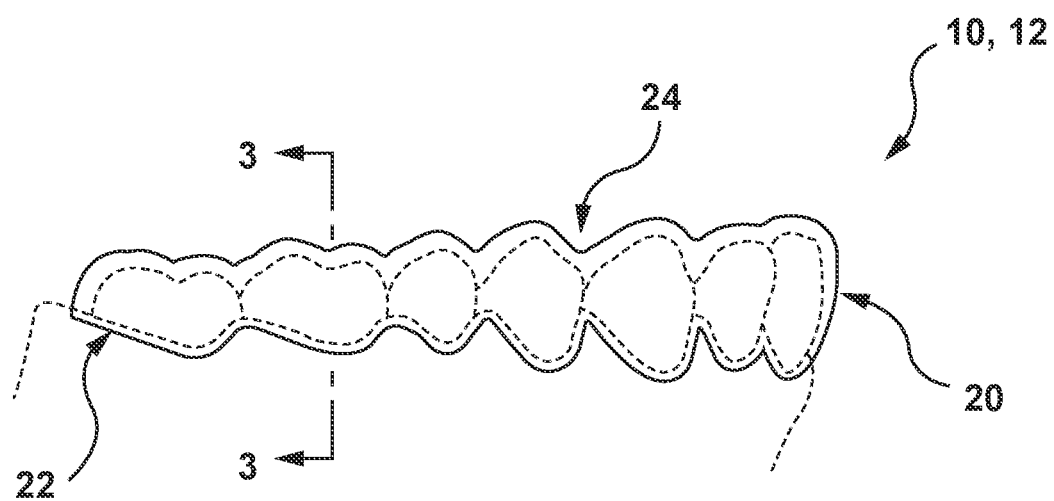
FIGS. 2 and 3 depict side and cross-sectional views, respectively, of a dental appliance applied to the subject's teeth that may be configured to treat the malocclusions of the subject's teeth present in FIG. 1, in accordance with certain non-limiting embodiments of the present technology.
Figure 3:
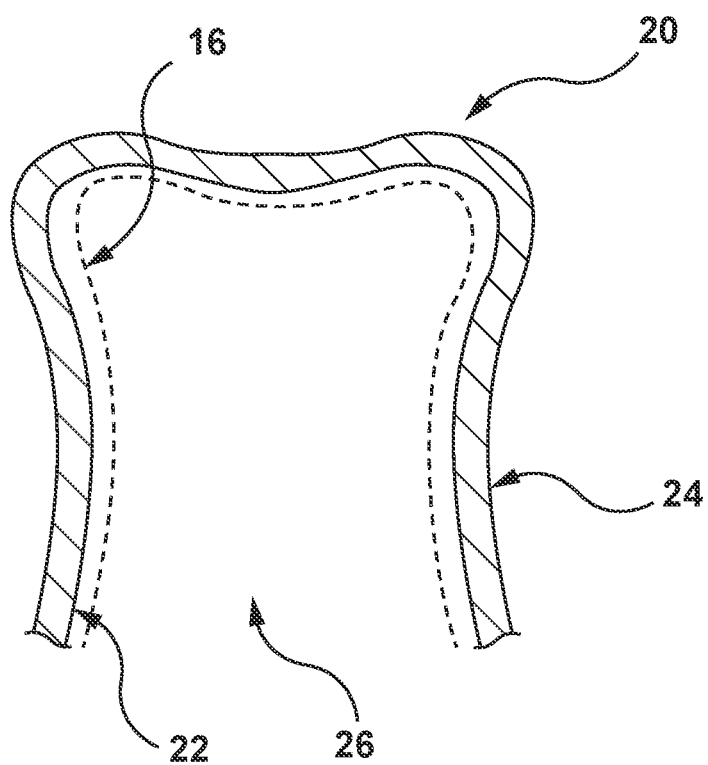

In specific non-limiting embodiments of the present the present technology, the orthodontic appliance may include at least one aligner. With reference to FIGS. 2 and 3, there is depicted an aligner 20 applied to at least some of the lower teeth 12, in accordance with certain non-limiting embodiments of the present technology. The aligner 20 comprises an inner surface 22 and an outer surface 24. The inner surface 22 defines a channel 26, which is configured, in some non-limiting embodiments of the present technology, for receiving crown portions of at least some of the lower teeth 12, such as the given lower tooth 16. However, in other non-limiting embodiments of the present technology, the channel 26 of the aligner 20 may be configured to receive crown portions of all of the lower teeth 12. At least one edge (also referred to herein as an "open edge") of the channel 26 is shaped for following a gum line (not depicted) along the lower gingiva 14.

It will be appreciated that, in accordance with certain non-limiting embodiments of the present technology, the aligner 20 may be used for treating different teeth malocclusions, including but not limited to one or more of: closing interdental spaces ("space closure"), creating/widening interdental spaces, tooth rotation, tooth intrusion/extrusion, and tooth translation, to name a few. It should further be noted that in certain non-limiting embodiments of the present technology, applying the aligner 20 to the lower teeth 12 may further include applying specific attachments thereto.

As may become apparent, the aligner 20 may be designed in such a way that its inner surface 22 is configured to impose respective forces on one or more of the lower teeth 12 to obtain a desired position of the lower teeth 12 at a given stage of the orthodontic treatment.

Needles to say that, although in the depicted embodiments of FIGS. 2 and 3, the aligner 20 is configured to be applied onto the lower teeth 12, in other non-limiting embodiments of the present technology, a respective configuration of the aligner 20 may be applied to the upper teeth 13 of the subject for treating misalignment of at least some thereof—such as the given upper tooth 17. By so doing, the desired occlusion between the lower teeth 12 and the upper teeth 13 may be attained.

According to certain non-limiting embodiments of the present technology, the aligner 20 may be made of a polymer, such as a thermoplastic material. In other non-limiting embodiments of the present technology, the aligner 20 may be made of poly-vinyl chloride (PVC). In yet other non-limiting embodiments of the present technology, the aligner 20 may be made of polyethylene terephthalate glycol (PETG). Other suitable materials can also be used to form the aligner 20.

In some non-limiting embodiments of the present technology, the aligner 20 may be manufactured using additive manufacturing techniques, such as 3D printing techniques where the aligner 20 is formed by printing according to a pre-generated 3D representation thereof.

In other non-limiting embodiments of the present technology, the aligner 20 may be produced by a thermoforming process where (1) an unfinished aligner is produced, using a preform, on a respective aligner mold (not depicted) associated with a respective stage of the orthodontic treatment, which is configured to shape the inner surface 22 of the aligner 20; and (2) the unfinished aligner is cut along a predetermined cut line to remove excess material therefrom, thereby producing the aligner 20, the predetermined cut line defining the at least one edge of the channel 26 of the aligner 20.

In specific non-limiting embodiments of the present technology, the aligner 20 may be manufactured in accordance with one or more methods described in a co-owned U.S. Pat. No. 11,191,618-B1, issued on Dec. 7, 2021, entitled "SYSTEMS AND METHODS FOR FORMING A DENTAL APPLIANCE," the content of which is incorporated herein by reference in its entirety.

As it may become apparent, to produce the aligner 20 for achieving the desired occlusal relationship between the lower teeth 12 and the upper teeth 13 during the orthodontic treatment, the tooth movements of subject's teeth to which the aligner 20 is to be applied to should be carefully planned, based on respective 3D representations (such as 3D meshes, point clouds, as will be described below) of the lower arch form 10 and the upper arch form 11, for example, to determine respective forces applied to the subject's teeth during respective stages of the orthodontic treatment. For example, the respective 3D representations of each one of the lower arch form 10 and the upper arch form 11 of the subject may be generated using intra-oral scanning techniques.

Further, as stated above, for a more accurate modelling of tooth movements of the subject's teeth, it may be required to obtain a bite position of the lower arch form 10 and the upper arch form 11, before receiving the orthodontic treatment, from respective 3D representations of each.

For example, according to conventional methods, to determine the bite position of the lower arch form 10 and the upper arch form 11, certain intra-oral scanning techniques include (1) scanning each one thereof independently to generate the respective 3D representations thereof; (2) registering the bite position therebetween by scanning both the lower arch form 10 and the upper arch form 11 in the bite position; and (3) using predetermined reference points located on the respective 3D representations of the lower arch form 10 and the upper arch form 11 and on a 3D scan representative of the bite position therebetween, placing the respective 3D representations in the bite position.

However, it has been appreciated that such an approach to registering the bite position may result in the respective 3D representations intersecting one another which does not accurately correspond to the actual anatomical configuration of the lower arch form 10 and the upper arch form 11 relative to each other in the bite position. More specifically, instead of reproducing current occlusal contacts between the lower teeth 12 and the upper teeth 13 of the subject, the respective 3D representations may overlap in an area of occlusal contacts between at least some of the lower teeth 12 and the upper teeth 13, which does not correspond to a natural bite position of the subject's teeth. As a result, using these techniques may affect accuracy of further planning the orthodontic treatment including, for example, the modelling the tooth movements, which may further result in the aligner 20 thus produced providing ineffective orthodontic treatment and/or causing certain discomfort (such as pain) to the subject.

Thus, certain non-limiting embodiments of the present technology are directed to methods and systems for determining the bite position of the lower arch form 10 and the upper arch form 11 on the respective 3D representations using an optimization algorithm. More specifically, according to at least some non-limiting embodiments, the methods and systems described herein are directed to (1) generating the respective 3D representations in a form of points clouds; (2) determining, from each point of a first 3D representation of the lower arch form 10, a respective distance value to a second 3D representations of the upper arch form 11; (3) aggregating respective distance values over the first 3D representation of the lower arch form 10 to generate an aggregate distance value indicative of a remoteness measure between the first 3D representation and the second 3D representation; and (4) minimizing, using the optimization algorithm, the aggregate distance value such that a number of overlap occurrences between the respective 3D representations is minimized, thereby determining the bite position the lower arch form 10 and the upper arch form 11.

How the aggregate distance value can be determined, according to certain non-limiting embodiments of the present technology, will be described in greater detail below with reference to FIGS. 6 to 10.

System

Figure 4:
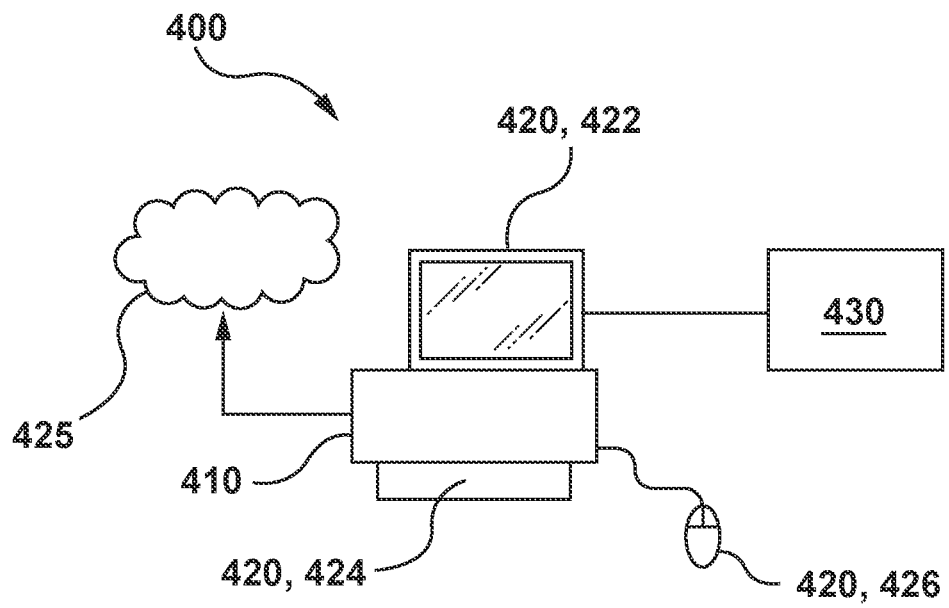
FIG. 4 depicts a schematic diagram of a system for determining a bite position of the subject's teeth present in FIG. 1, in accordance with certain embodiments of the present technology.
Figure 5:
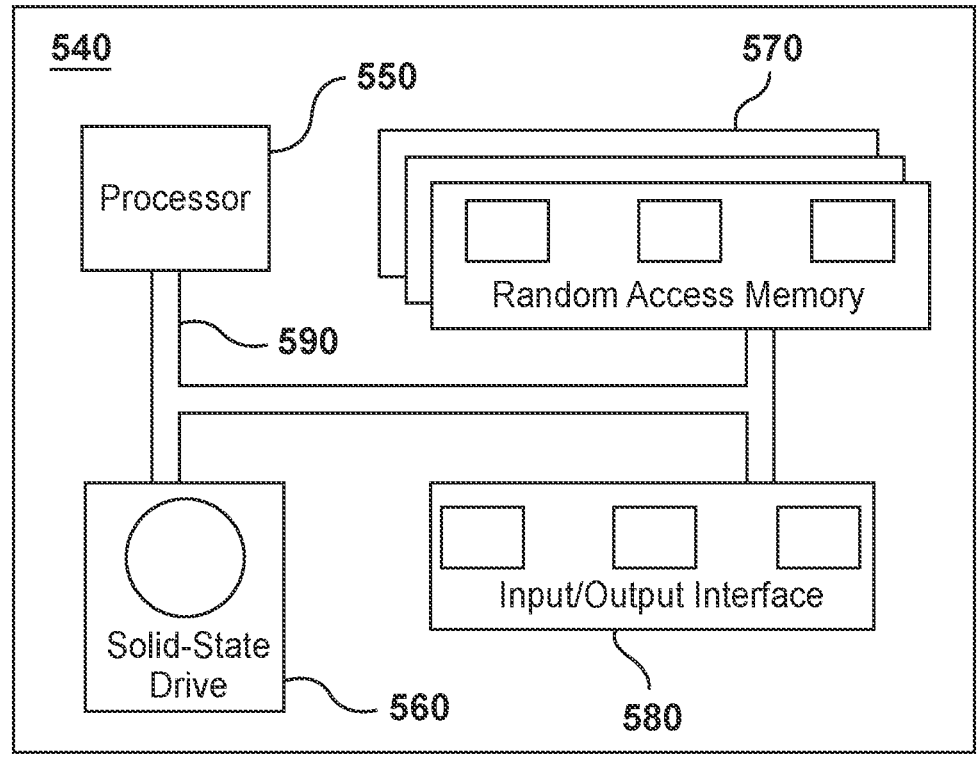
FIG. 5 depicts a schematic diagram of a computing environment of the system of FIG. 4, in accordance with certain embodiments of the present technology.

With reference to FIGS. 4 and 5, there is depicted a schematic diagram of a system 400 suitable for determining the bite position of the lower arch form 10 relative to the upper arch form 11, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to determine, based on image data associated with the subject, such as the respective 3D representations of the lower arch form 10 and the upper arch form 11, the bite position therebetween. In additional non-limiting embodiments of the present technology, the computer system 410 may further be configured to model the movements of the at least some of the lower teeth 12 relative to the upper teeth 13, for example, for determining the occlusal contacts therebetween, as will be described below.

To that end, in some non-limiting embodiments of the present technology, the computer system 410 may be configured to receive the image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In some non-limiting embodiments of the present technology, the computer system 410 may be configured to receive the image data associated with the subject directly from an imaging device 430 communicatively coupled thereto. Broadly speaking, the processor 550 may be configured to cause the imaging device 430 to capture and/or process the image data of the lower teeth 12 and the periodontium (not depicted) of the subject. In certain non-limiting embodiments of the present technology, the image data may include, for example, one or more of: (1) images of external surfaces of respective crown portions of the lower teeth 12, (2) images of an external surface of the periodontium including those of the lower gingiva 14, the alveolar mandibular bone (not depicted), and images of superficial blood vessels and nerve pathways associated with the lower teeth 12; and (3) images of an oral region. By doing so, the imaging device 430 may be configured, for example, to capture image data of the lower arch form 10 of the subject. In another example, the imaging device may also be configured to capture and/or process image data of an upper arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling to capture direct optical impressions of the at least one of the lower arch form 10 and the upper arch form 11 of the subject.

In a specific non-limiting example, the intraoral scanner can be of one of the types available from MEDIT, CORP. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold (not depicted) representing the given configuration of the at least one of the lower arch form 10 and the upper arch form 11 associated with the respective stage of the orthodontic treatment. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from DENTAL WINGS, INC. of 2251, ave Letourneux, Montreal (QC), Canada, H1V 2N9. It should be expressly understood that the desktop scanner can be implemented in any other suitable equipment.

In yet other non-limiting embodiments of the present technology, the imaging device 430 can comprise a 3D laser scanner enabling to obtain a respective point cloud 3D representation of the at least one of the lower arch form 10 and the upper arch form 11—such as by scanning the mold thereof and thus registering three-dimensional coordinates of points representative of the surface of the mold.

In a specific non-limiting example, the 3D laser scanner can be of one of the types available from LASER DESIGN of 5900 Golden Hills Drive, Minneapolis, Minn. 55416. It should be expressly understood that the desktop scanner can be implemented in any other suitable equipment.

Further, it is contemplated that the computer system 410 may be configured for processing of the received image data. The resulting image data of the lower arch form 10 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random-access memory 570 and an input/output interface 580. Communication between the various components of the computing environment 540 may be enabled by one or more internal and/or external buses 590 (e.g. a Peripheral Component Interconnect (PCI) bus, a universal serial bus (USB), IEEE 1394 "Firewire" bus, a Small Computer System Interface (SCSI) bus, a Serial AT Attachment (Serial-ATA) bus, an Aeronautical Radio Incorporated (ARINC) bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, or Token Ring™. The specific physical layer and the data link layer may provide a base for a full network protocol stack, allowing communication among small groups of computers on the same local area network (LAN) and large-scale network communications through routable protocols, such as IP.

According to implementations of the present technology, the solid-state drive 560 stores program instructions suitable for being loaded into the random-access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Image Data

As alluded to above, according to certain non-limiting embodiments of the present technology, the processor 550 may be configured to: (1) receive image data indicative of current configurations of each one of the lower arch form 10 and the upper arch form 11; (2) determine, based on the image data, the bite position of the lower teeth 12 and the upper teeth 13 of the subject; and (3) determine, based on the bite position, the orthodontic treatment for the subject.

Figure 6:
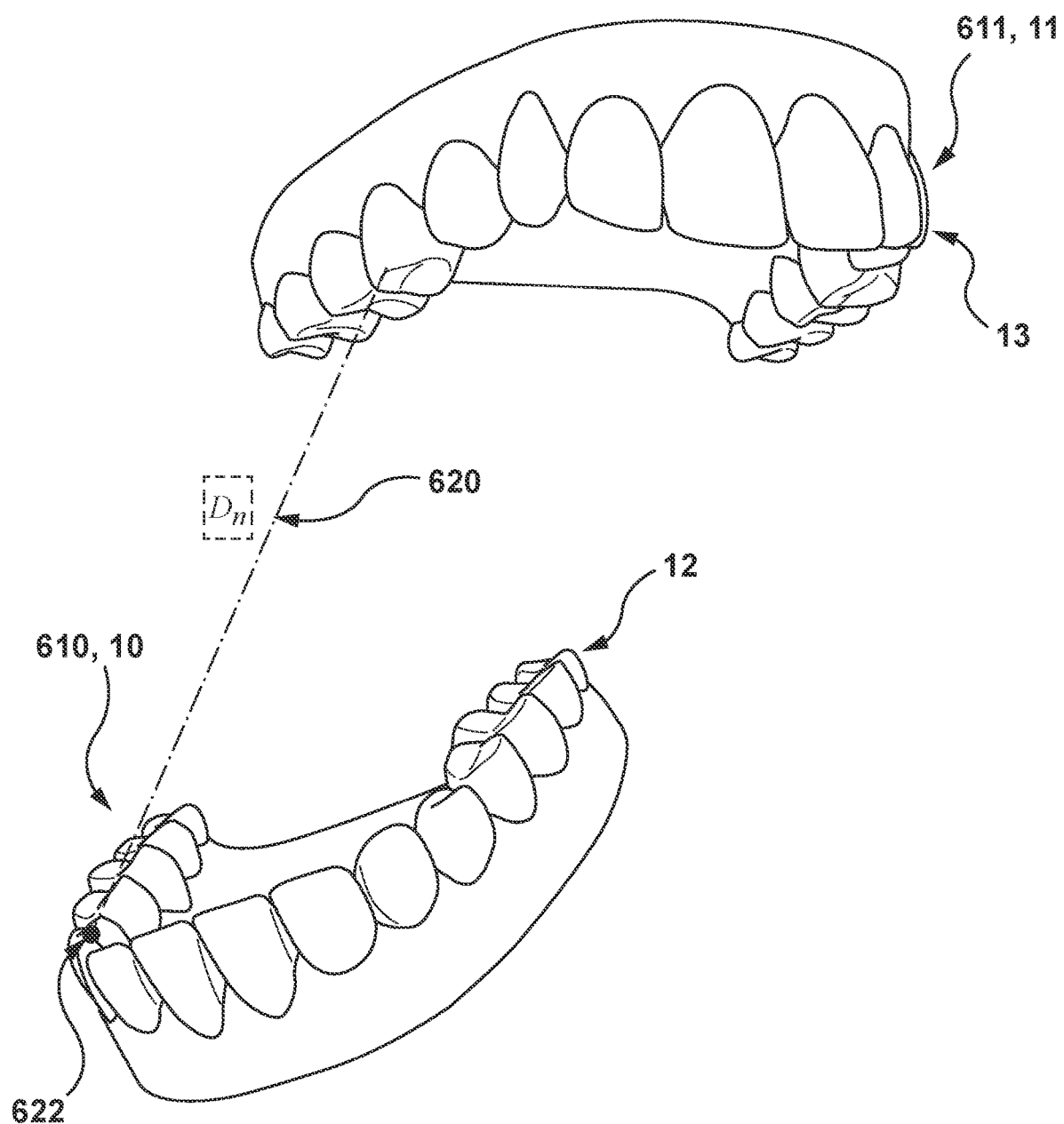
FIG. 6 depicts independently generated 3D models of the subject's arch forms present in FIG. 1 used, by a processor of FIG. 5, to determine the bite position therebetween, in accordance with certain non-limiting embodiments of the present technology.

With reference to FIG. 6, there is depicted a perspective view of a first model 610 and a second model 611 respectively representative of the current configurations of the lower arch form 10 and the upper arch form 11, in accordance with certain non-limiting embodiments of the present technology.

As it can be appreciated, in some non-limiting embodiments of the present technology, the processor 550 can be configured to receive each one of the first model 610 and the second model 611 independently—such that they are not representative of an actual occlusal relationship of the lower arch form 10 relative to the upper arch form 11.

In some non-limiting embodiments of the present technology, the processor 550 may be configured to receive each one of the first model 610 and the second model 611 comprising a respective plurality of mesh elements (not depicted) representative of respective surfaces of each one of the lower arch form 10 and the upper arch form 11. For example, in those non-limiting embodiments of the present technology where the imaging device 430 is a conventional intra-oral scanner, the processor 550 can be configured to receive each one of the first model 610 and the second model 611 directly therefrom. In these embodiments, the imaging device 430 can be configured to generate the plurality of mesh elements including, without limitation, triangular mesh elements, quadrilateral mesh elements, convex polygonal mesh elements, or even concave polygonal mesh elements, as an example, without departing from the scope of the present technology.

However, in other non-limiting embodiments of the present technology, each one of the first model 610 and the second model 611 may comprise a respective point cloud 3D representation including pluralities of points respectively representative of surfaces of the lower arch form 10 and the upper arch form 11.

In some non-limiting embodiments of the present technology where the imaging device 430 is the 3D laser scanner, the processor 550 may be configured to receive each one of the first model 610 and the second model 611 as taken by the imaging device 430. In other non-limiting embodiments of the present technology, where the imaging device 430 is the conventional intraoral scanner configured for providing the respective pluralities of mesh elements representative of the lower arch form 10 and the upper arch form 11, the processor 550 may be configured to pre-process each one of the first model 610 and the second model 611 to remove image data representative of the mesh edges therefrom leaving only image data representative of the mesh vertices, or to otherwise convert from mesh configuration to point cloud configuration.

Thus, in some non-limiting embodiments of the present technology, the processor 550 can be configured to covert a given one of the first model 610 and the second model 611 from one of these formats to the other. For example, in some non-limiting embodiments of the present technology, the processor 550 may be configured to restore, from points of the point cloud 3D representation of the given one of the first model 610 and the second model 611, the respective one of the plurality of meshes associated therewith, and vice versa.

It should be noted that it is not limited how points are distributed within the given one of the first model 610 and the second model 611; and in some non-limiting embodiments of the present technology, the points may be distributed uniformly therewithin. However, in other non-limiting embodiments of the present technology, the points may have variable distribution within the given one of the first model 610 and the second model 611, such as have higher density in regions representative of a respective one of the lower teeth 12 and the upper teeth 13 and have lower density in the regions representative of a respective one of the lower gingiva 14 and upper gingiva 15.

Determining Distances Between Arch Forms

According to certain non-limiting embodiments of the present technology, the processor 550 may be configured to determine the bite position between the first model 610 and the second model 611 by determining a remoteness measure therebetween in a current spatial relationship therebetween as received, for example, from the imaging device 430. In some non-limiting embodiments of the present technology, the current spatial relationship between the first model 610 and the second model 611 can be arbitrary, as depicted in FIG. 6, for example. However, in other non-limiting embodiments of the present technology, the processor 550 may be configured to determine the current spatial relationship between the first model 610 and the second model 611 as being an initial approximation (not depicted) of the bite position between the lower arch form 10 and the upper arch form 11—such as when the first model 610 is positioned relative to the second model 611 approximating the bite position between the lower teeth 12 and the upper teeth 13. In these embodiments, the processor 550 may be configured to obtain the initial guess of the bite position from the practicing clinician, as an example.

Further, in some non-limiting embodiments of the present technology, to determine the remoteness measure between the first model 610 and the second model 611, the processor 550 may be configured to determine the respective distance values from each point (or otherwise vertex) of the first model 610 to the second model 611.

In some non-limiting embodiments of the present technology, the processor 550 may be configured to determine the respective distance values—such as a respective distance value 620 associated with a given point 622 of the first model 610—using a predetermined distance field associated with the second model 611.

In the context of the present specification, the term "distance field" denotes a scalar field defined around a given object—such as the upper arch form 11 and the second model 611 representative thereof, each value of which is indicative of a shortest respective path from the given object to another object positioned in a surrounding of the given object.

Figure 7:
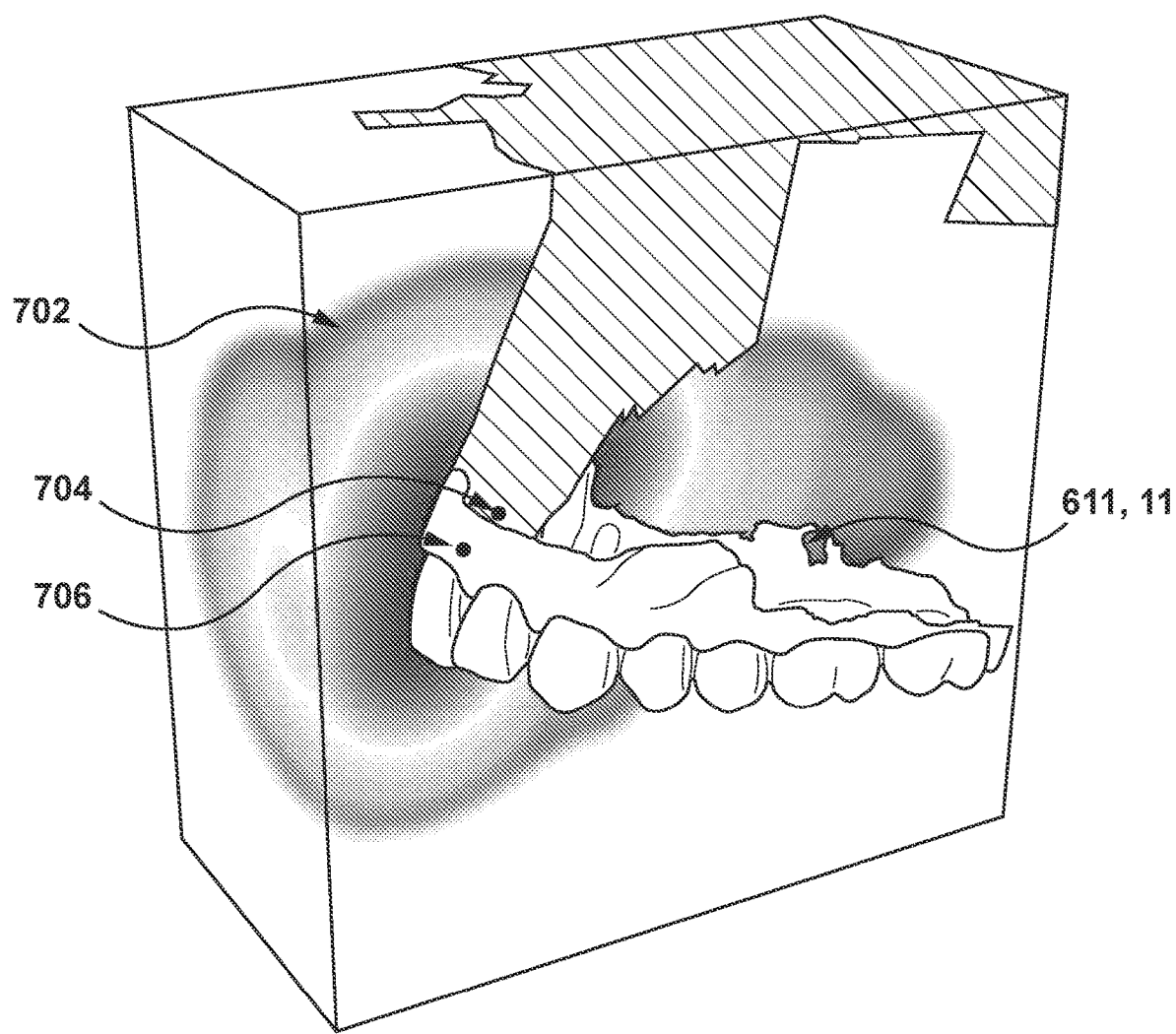
FIG. 7 depicts a schematic diagram of a distance field used, by the processor of FIG. 5, for determining respective distance values between points of the 3D models of FIG. 6, in accordance with certain non-limiting embodiments of the present technology.

With reference to FIG. 7, there is depicted a schematic representation of a distance field 702 used, by the processor 550, to determine the respective distance values between the first model 610 and the second model 611, in accordance with certain non-limiting embodiments of the present technology.

In some non-limiting embodiments of the present technology, the distance field 702 is a signed distance field. To that end, the processor 550 can be configured to determine the distance field 702 by: (1) converting the second model 611 into a voxel space; (2) assigning, to each voxel positioned inside the second model 611, a respective negative distance value from a surface of the second model 611; and (3) assign, to each voxel positioned outside the second model 611, a respective positive distance value from the surface of the second model 611.

Thus, in the embodiments depicted in FIG. 7, the distance field 702 is represented as having a higher intensity of regions thereof closer to the surface of the second model 611, and have lesser intensity of regions farther from the surface of the second model 611. Further, in regions inside the surface of the second model 611, the distance field 702 is represented to have a different scale to indicate a negative value thereof inside the surface of the second model 611.

Further, to determine if a given point (including those of the first model 610, not depicted in FIG. 7) in a surrounding of the second model 611, such as one of a first point 704 and a second point 706, is positioned inside or outside of the surface of the second model 611, in some non-limiting embodiments of the present technology, the processor 550 can be configured to determine a projection thereof onto the surface of the second model 611 along a shortest path thereto.

Figure 8:
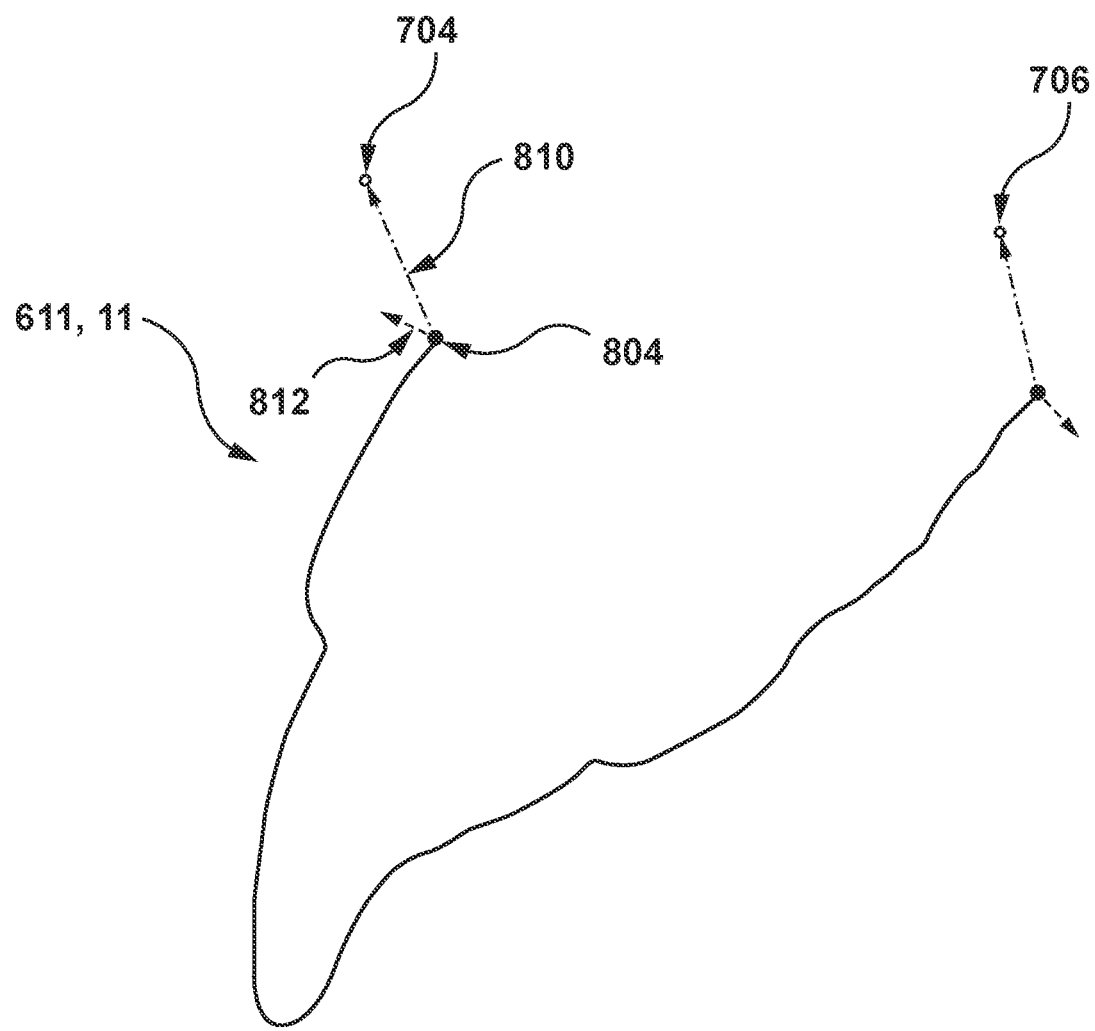
FIG. 8 depicts a schematic diagram of a step for determining, by the processor of FIG. 5, spatial positions of points within the distance field of FIG. 7, according to certain embodiments of the present technology.

With reference to FIG. 8, there is schematically depicted a lateral projection of a portion of the second model 611 illustrating a step for determining, by the processor 550, positions of surrounding points relative to the surface the second model 611, in accordance with certain non-limiting of the present technology.

In some non-limiting embodiments of the present technology, to determine the positions of each one of the first point 704 and the second point 706, the processor 550 can be configured to determine a respective projection point thereof onto the surface of the second model 611—such as a first projection point 804 of the first point 704.

Further, according to certain non-limiting embodiments of the present technology, the processor 550 can be configured to construct a first direction vector 810 from the first projection point 804 to the first point 704. Further, the processor 550 may be configured to determine a first normal vector 812 to the surface of the second mode 611 at the first projection point 804.

Finally, in some non-limiting embodiments of the present technology, the processor 550 may be configured to determine the position of the first point 704 relative to the surface of the second model 611 based on an angular value between the first direction vector 810 and the first normal vector 812. More specifically, in response to the angular value being less than 90 degrees, the processor 550 may be configured to determine that the first point 704 is positioned inside the surface of the second model 611; by contrast, in response to the angular value being greater than 90 degrees—which is the case of the second point 706, for example, the processor 550 may be configured to determine that the second point 706 is positioned outside the surface of the second model 611.

It should be expressly understood that other techniques for determining the spatial positions of the surrounding points relative to the surface of the second model 611, such as generating a depth map image associated with the second model 611 and the surrounding thereof, are also envisioned without departing from the scope of the present technology.

By doing so, in accordance with certain non-limiting embodiments of the present technology, the processor 550 may be configured to determine spatial positions of each point of the first model 610 relative to the second model 611 and further, using the distance field 702, determine the respective distance values therefrom to the second model 611.

It should be noted that alternatively or additionally, the processor 550 may be configured to use another approach to determine the respective distance values. For example, in additional non-limiting embodiments of the present technology, the processor 550 may be configured to determine the respective distance values as distances from each point of the first model 610 to a predetermined occlusal plane associated with the upper teeth 13, as described in a co-owned U.S. Pat. No. 11,191,619-B1, entitled "METHODS AND SYSTEMS FOR DETERMINING OCCLUSAL CONTACTS BETWEEN TEETH OF A SUBJECT", issued on Dec. 7, 2021, and the content of which is incorporated herein by reference in its entirety.

Determining a Remoteness Measure Between the Arch Forms

As noted above, according to certain non-limiting embodiments of the present technology, based on the so determined respective distance values from each point of the first model 610 to the second model 611, the processor 550 may be configured to determine the remoteness measure therebetween.

To that end, in some non-limiting embodiments of the present technology, the processor 550 may be configured to determine, based on the respective distance values, an aggregate distance value. For example, the processor 550 may be configured to determine the aggregate distance value as being a sum of the respective distance values associated with the points of the first model 610. However, in other non-limiting embodiments of the present technology, using other mathematical operations, such as multiplication, are also envisioned without departing from the scope of the present technology.

In yet other non-limiting embodiments of the present technology, the processor 550 can be configured to determine the aggregate distance value based on respective weighted distance values. To that end, in these embodiments, the processor 550 may be configured to assign a respective weight value to each one of the respective distance values—such as the respective distance value 620 associated with the given point 622 of the first model 610, as depicted in FIG. 6. In these embodiments, for example, the processor 550 may be configured to determine the respective weighted distance value associated with the given point 622 in accordance with an equation:

$$f_P(n) = D_n W_n, \quad (1)$$

where $D_n$ is a respective distance value 620 from the given point 622 of the first model 610 to the second model 611, and $W_n$ is a respective weight value associated with the given point 622.

Further, in these embodiments, the processor 550 can be configured to determine the aggregate distance value between the first model 610 and the second model 611 in accordance with an equation:

$$f_O = \sum_{n=1}^{N} f_P(n), \quad (2)$$

where $f_P(n)$ is the respective weighted distance value associated with the given point 622 of the first model 610.

Thus, in some non-limiting embodiments of the present technology, the processor 550 can be configured to determine the aggregate distance value used as the remoteness measure between the first model 610 and the second model 611, by optimizing which, the processor 550 may further be configured to determine the bite position o the lower teeth 12 and the upper teeth 13.

It should be expressly understood that it is not limited how the processor 550 may be configured to determine the respective weight value for the respective distance value 620. However, in some non-limiting embodiments, respective distance values associated with points of the first model 610 representative of occlusal surfaces of respective ones of the lower teeth 12 may be assigned greater respective weight values than respective distance values associated with other points.

In other non-limiting embodiments of the present technology, the processor 550 may be configured to determine the respective weight value for the respective distance value 620 based on a curvature of the first model 610 at the given point 622. For example, the processor 550 may be configured to assign a greater respective weight value to the respective distance value 620 if the curvature of the first model at the given point 622 is higher than a predetermined threshold; else the processor 550 can be configured to assign a smaller respective weight value.

How the processor 550 can be configured to analyze the curvature of the first model 610 is also not limited, and in some non-limiting embodiments of the present technology, the processor 550 may be configured to analyze mutual positions of (such as based on angular values between) respective normal vectors at each point of the first model 610. In these embodiments, the processor 550 may be configured to apply one of the following techniques to determine the respective normal vectors associated with the points of the first model 610: a mean weighted equality algorithm, a mean weighted by angle algorithm, a mean weighted by sine and edge length reciprocal algorithm, a mean weighted by areas of adjacent mesh elements, and the like. Details of implementation of some of these algorithms may be obtained, for example, from an article titled "*A Comparison of Algorithms for Vertex Normal Computation*" by Shuangshuang Jin, Robert R. Lewis, David West, and published by Washington State University in Visual Computer Journal, the content of which is incorporated herein by reference in its entirety.

However, in some non-limiting embodiments of the present technology, as noted above, the processor 550 may be configured to restore, based on the points of the first model 610, mesh format of the first model 610—that is reconstruct mesh elements thereof by joining the points by respective edges. To that end, in these embodiments, the processor 550 may be configured to determine the curvature of the first model 610 at each point thereof based on a surface area of respective mesh elements adjacent thereto.

Figure 9:
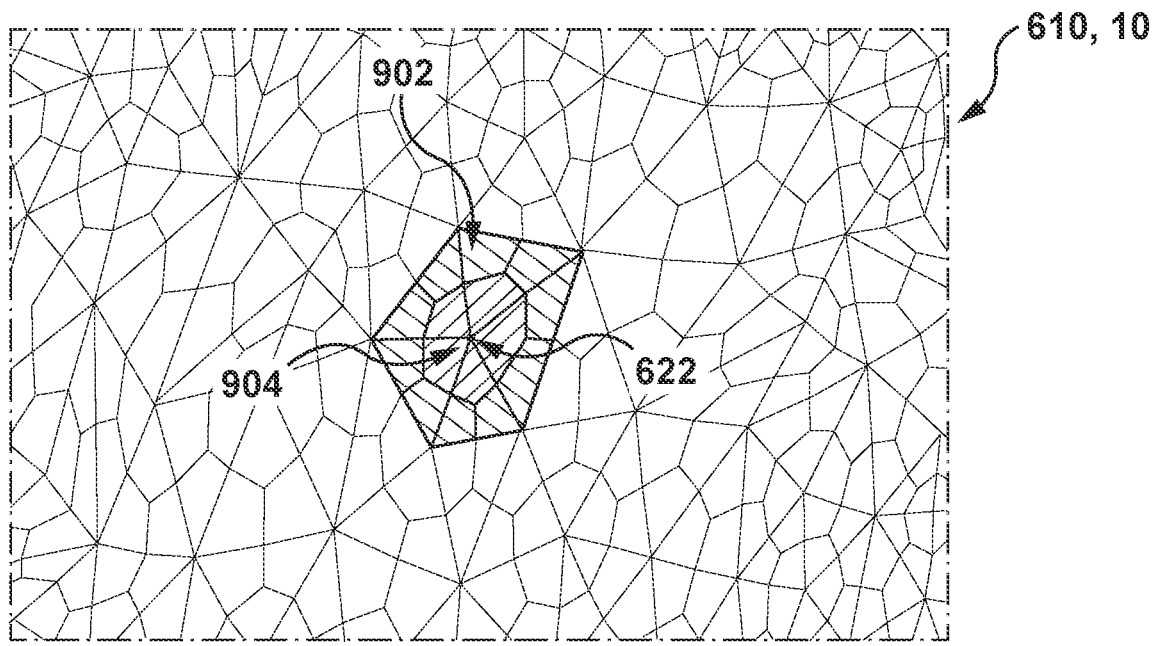
FIG. 9 depicts a schematic diagram of a step for determining, by the processor of FIG. 5, respective weight values for the respective distance values between the 3D models of the subject's arch forms depicted in FIG. 6, according to certain non-limiting embodiments of the present technology.

With reference to FIG. 9, there is depicted a schematic diagram of a restored mesh elements of the first model 610 illustrating a step for determining, by the processor 550, the curvature thereof at the given point 622, in accordance with certain non-limiting embodiments of the present technology.

As best shown in the example illustrated by FIG. 9, in some non-limiting embodiments of the present technology, the processor 550 can be configured to determine a surface area of a polygon 902 formed by mesh elements of the first model 610 adjacent to the given point 622. Further, the processor 550 can be configured to multiply the determined surface area by a predetermined coefficient, thereby determining the respective weight values associated with the given point 622. Thus, the respective weight value may be said to be indicative of a respective portion 904 of the polygon 902 defined around the given point 622 of the first model 610.

In some non-limiting embodiments of the present technology, the predetermined coefficient is determined empirically. For example, the predetermined coefficient can be determined to be ⅓ as an optimal value thereof for implementing specific non-limiting embodiments of the present technology. In other words, the processor 550 may be configured to determine the respective weight value associated with the given point 622 in accordance with the following equation:

$$W_n = \tfrac{1}{3} A(P_n), \quad (3)$$

where $A(P_n)$ is the surface area of the polygon 902 formed by the mesh elements of the first model 610 adjacent to the given point 622.

It should be expressly understood that in other non-limiting embodiments of the present technology, the predetermined coefficient can have other values, such as 0.1, 0.5, 1.2, or 5.0, for example, without departing from the scope of the present technology.

Determining the Bite Position Between the Arch Forms

Thus, based on the so determined remoteness measure, the processor 550 may further be configured to determine the bite position of the lower arch form 10 relative to the upper arch form 11.

To that end, according to some non-limiting embodiments of the present technology, the processor 550 may be configured to minimize the aggregate distance value associated with the current spatial relationship between the first model 610 and the second model 611. In some non-limiting embodiments of the present technology, the optimization algorithm can be configured to balance the following conditions: (1) minimizing the aggregate distance value causing displacement of the first model 610 relative to the second model 611; and (2) minimizing a number of overlap occurrences between the first model 610 and the second model 611, until a convergence thereof, thereby determining an optimized position of the first model 610 relative to the second model 611. In these embodiments, the processor 550 can further be configured to determine the optimized position of the first model 610 relative to the second model 611 as being representative of the bite position between the lower arch form 10 and the upper arch form 11 of the subject.

More specifically, in some non-limiting embodiments of the present technology, the processor 550 may be configured to iteratively apply one or more transformation rules to cause displacement of the first model 610 relative to the second model 611 to minimize the remoteness measure therebetween determined above while minimizing the number of overlap occurrences therebetween. For example, in some non-limiting embodiments of the present technology, the processor 550 may be configured to apply the one or more transformation rules including at least one of (1) translational transformation rule causing a translational movement of the first model 610 relative to the second model 611; and (2) rotational transformation rule causing a rotation movement of the first model 610 relative to the second model 611. In this regard, the displacement of the given point 622 of the first model 610 relative to the second model 611 at a given iteration may be formalized by the following equation:

$$X_i = C + RX_{i-1}, \quad (4)$$

where $X_{i-1}$ is a previous position of the given point 622 before applying the optimization algorithm at the given iteration;
C is a vector of Cartesian coordinates within a respective coordinate system determined by the optimization algorithm for the given iteration; and
R is a rotation matrix determined by the optimization algorithm to be applied to the first model 610 at the given iteration.

Hence, the processor 550 may be configured to apply the optimization algorithm to minimize the aggregate distance value until the optimization algorithm converges, that is, until the aggregate distance value does not exceed a predetermined convergence threshold value, which may be, about 0.5 mm, as an example.

In some non-limiting embodiments of the present technology, the optimization algorithm may comprise at least one of a gradient descent algorithm, a random search algorithm, a genetic algorithm, and a simulated annealing algorithm, as an example. It should be expressly understood that using other optimization algorithms is also contemplated.

Figure 10:
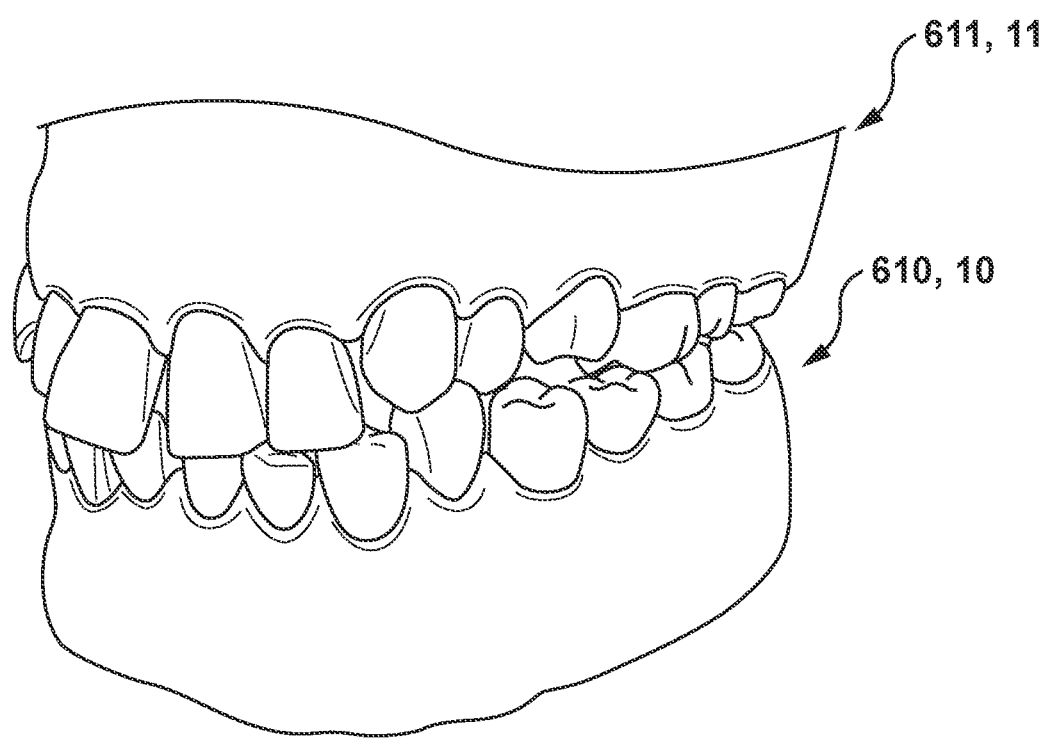
FIG. 10 depicts a schematic diagram of the 3D models of the subject's arch form of FIG. 6 in a position corresponding to the bite position between the subject's teeth, according to certain non-limiting embodiments of the present technology.

Thus, the processor 550 can be configured to determine the bite position of the lower arch form 10 relative to the upper arch form 11, which is schematically depicted in FIG. 10, in accordance with certain non-limiting embodiments of the present technology.

As noted above, in some non-limiting embodiments of the present technology, using the first model 610 and the second model 611 in the so determined bite position, the processor 550 may further be configured to model tooth movements of at least some of the lower teeth 12 and the upper teeth 13 of the subject to target positions thereof associated with their alignment within a respective one of the lower arch form 10 and the upper arch form 11 to determine the orthodontic treatment. In specific non-limiting embodiments of the present technology, to determine the orthodontic treatment, the processor 550 may be configured to apply one or more approaches described in a co-owned U.S. Pat. No. 10,993,782-B1 issued on May 4, 2021, entitled "SYSTEMS AND METHODS FOR DETERMINING A TOOTH TRAJECTORY," the content of which is incorporated herein by reference in its entirety.

Accordingly, as mentioned above, using the first model 610 and the second model 611 in the so determined bite position for determining the orthodontic treatment may allow (1) increasing safety of the orthodontic treatment, which may be achieved by modelling the tooth movements of the lower teeth 12 and the upper teeth 13 of the subject more accurately enabling, for example, to avoid collisions therebetween; and (2) increasing efficiency of the orthodontic treatment by reducing the overall time thereof, which may be achieved by manufacturing the aligner 20 being part of the orthodontic treatment considering the actual configuration of the occlusal contacts between the lower teeth 12 and the upper teeth 13 in the actual bite position.

Figure 11:
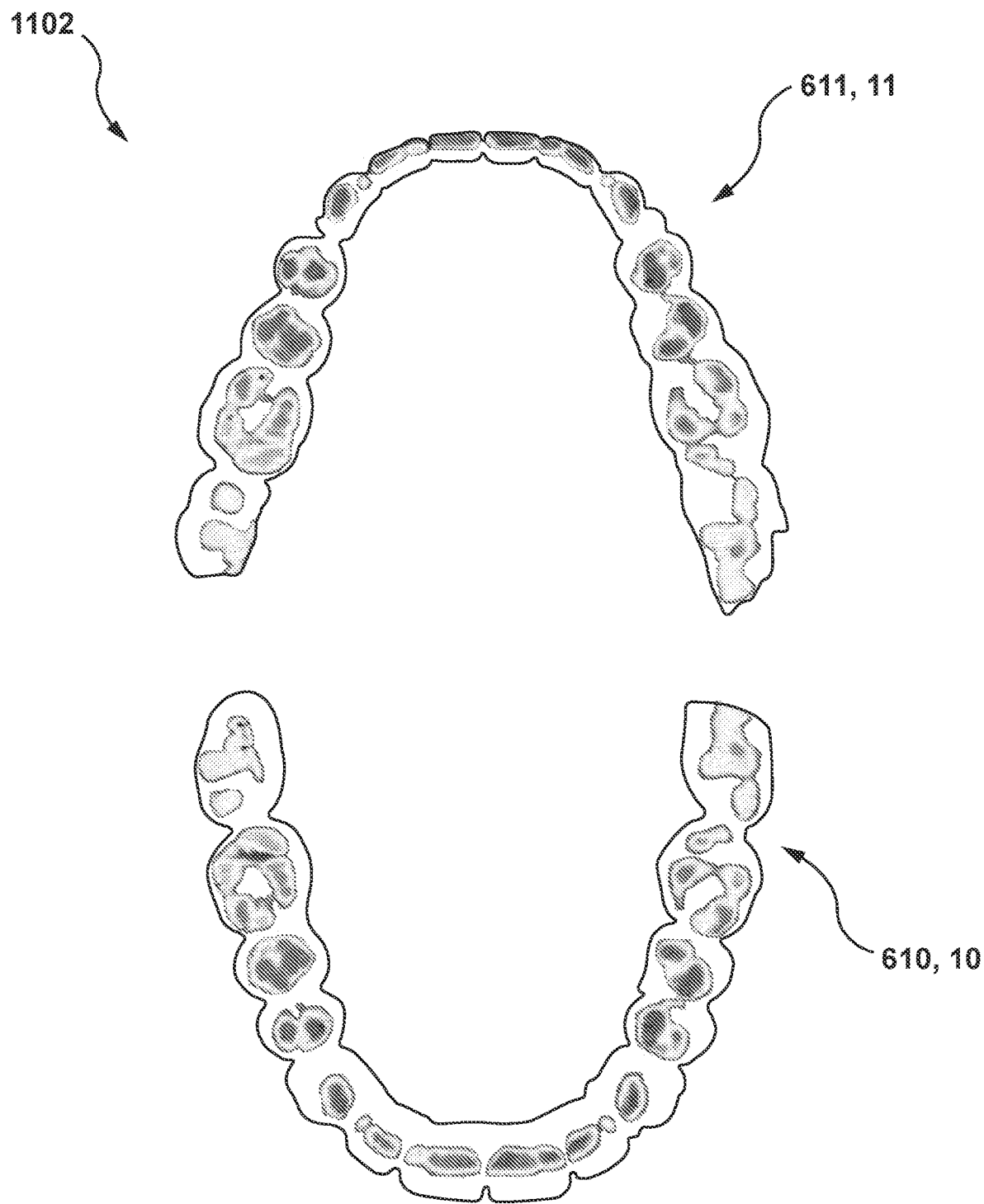
FIG. 11 depicts a schematic diagram of an example depth map representation generated, by the processor of FIG. 5, to visualize the bite position of the subject's teeth on the 3D models of FIG. 6, according to certain non-limiting embodiments of the present technology.

Further, in additional non-limiting embodiments of the present technology, the processor 550 may be configured to display the bite position of the lower teeth 12 and the upper teeth 13 by markings on portions of one or both of the first model 610 and the second model 611 corresponding to respective occlusal surfaces of the lower teeth 12 and the upper teeth 13. The markings may comprise a depth map representation 1102 of the bite position between of the lower teeth 12 relative to the upper teeth 13, which is schematically depicted in FIG. 11, in accordance with certain non-limiting embodiments of the present technology. The depth map representation 1102 may be representative of respective distance values associated with each point of the first model 610 determined as a result of applying the optimization algorithm as described above.

In some non-limiting embodiments of the present technology, the depth map representation 1102 may be a monochromatic depth map representation where greater values of the respective distance values from the points of the first model 610 are assigned greater intensity values of a given color, and vice versa. In other non-limiting embodiments of the present technology, the depth map representation 1102 may be a polychromatic heat map representation associated with a predetermined color spectrum including at least two colors. In this example, the greater values of the respective distance values are assigned respective colors closer to a lower boundary of the predetermined color spectrum (being a green color, for example), and smaller values of the respective distance values are assigned colors closer a higher boundary (being a red color, for example) of the predetermined color spectrum.

In additional non-limiting embodiments of the present technology, the processor 550 may be configured to store the depth map representation 1102 in one of the solid-state drive 560 and the random-access memory 570 for further causing display thereof on a display, such as the screen 422. The depth map representation 1102 may be displayed on the screen 422, for example, for examining the bite position between the lower teeth 12 and the upper teeth 13 by the practicing clinician, who may further manually amend the orthodontic treatment determined as described above based on her/his expertise.

Method

Figure 12:
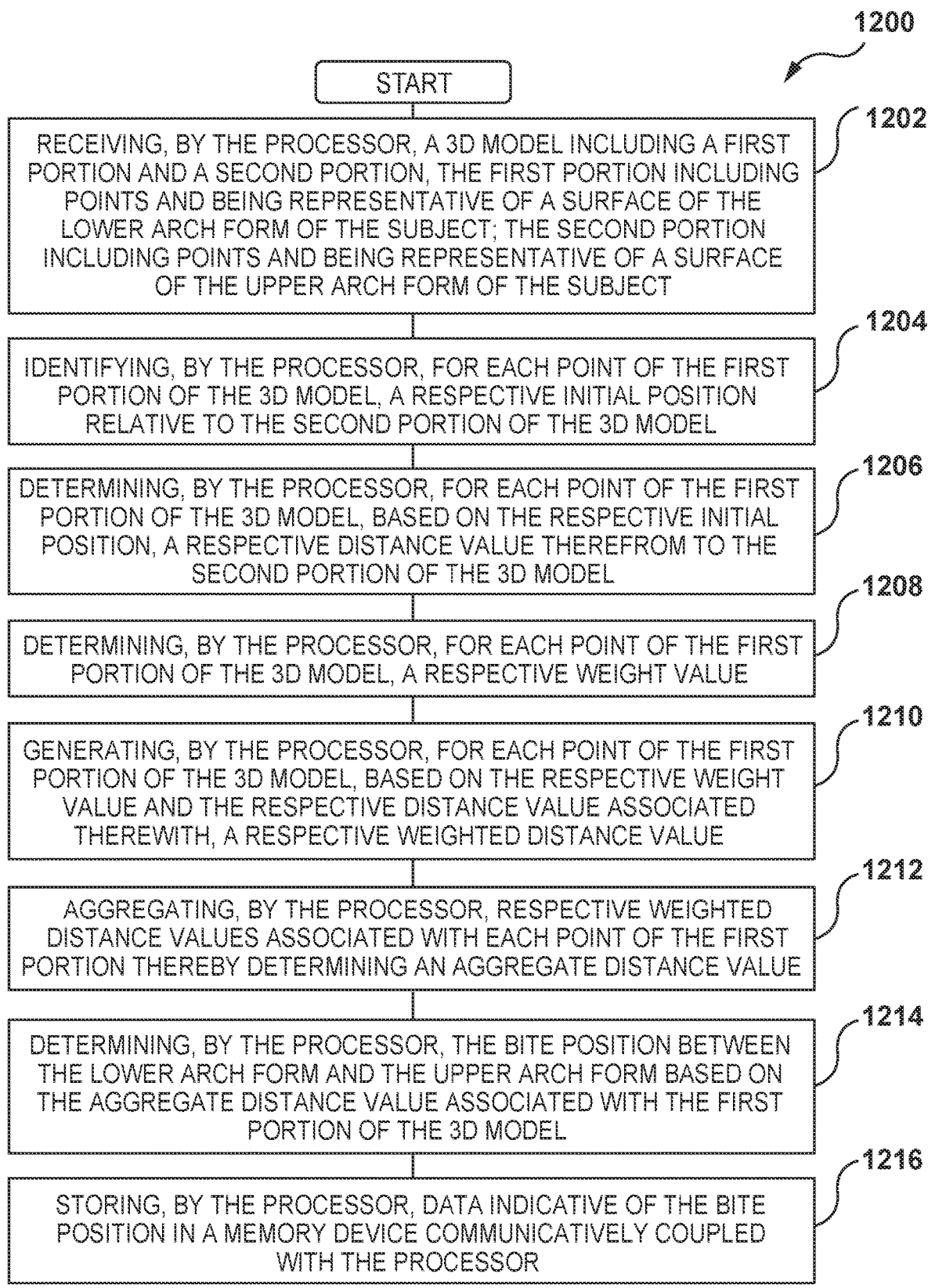
FIG. 12 depicts a flowchart of a method of determining the bite position of the subject's teeth present in FIG. 1, according to certain embodiments of the present technology.

Given the architecture and the examples provided hereinabove, it is possible to execute a method for determining the bite position between the lower teeth 12 and the upper teeth 13 of the subject. With reference now to FIG. 12, there is depicted a flowchart of a method 1200, according to certain non-limiting embodiments of the present technology. The method 1200 may be executed by the processor 550 of the system 400.

Step 1202: Receiving, by the Processor, a 3D Model Including a First Portion and a Second Portion, the First Portion Including Points and being Representative of a Surface of the Lower Arch Form of the Subject; the Second Portion Including Points and being Representative of a Surface of the Upper Arch Form of the Subject The method 1200 commences at step 1202 with the processor 550 being configured to receive the first model 610 and the second model 611 respectively representative of surfaces of the lower arch form 10 and the upper arch form 11 of the subject. In some non-limiting embodiments of the present technology, the processor 550 may be configured to receive each one of the first model 610 ad the second model 611 having been taken, for example, by the imaging device 430, independently, that is, without an indication of any predetermined spatial relationship therebetween, as depicted in FIG. 6, as an example.

Further, as noted above, in some non-limiting embodiments of the present technology, the processor 550 may be configured to receive each one of the first model 610 and the second model 611 comprising a respective plurality of mesh elements. However, in other non-limiting embodiments of the present technology, each one of the first model 610 and the second model 611 may be representable by point clouds of a respective plurality of points.

As noted further above, in certain non-limiting embodiments of the present technology, the processor 550 may be configured to convert a given one of the first model 610 and the second model 611, from the mesh format into the point cloud format and vice versa.

The method 1200 thus proceeds to step 1204.

Step 1204: Identifying, by the Processor, for Each Point of the First Portion of the 3D Model, a Respective Initial Position Relative to the Second Portion of the 3D Model Further, at step 1204, the processor 550 may be configured to identify a respective initial position of each point (or otherwise vertex) of the first model 610 relative to the second model 611. To that end, the processor 550 may be configured to define a coordinate system (not depicted) around the first model 610 and the second model 611. As a non-limiting example, the coordinate system may be three-dimensional describing respective Cartesian coordinates of each point of a given one of the first model 610 and the second model 611. However, it should be noted that the coordinate system may include additional dimensions representative of other parameters of the given one of the first model 610 and the second model 611 at each point thereof, such as a colour and/or texture parameter, as an example.

The method 1200 hence advances to step 1206.

Step 1206: Determining, by the Processor, for Each Point of the First Portion of the 3D Model, Based on the Respective Initial Position, a Respective Distance Value Therefrom to the Second Portion of the 3D Model At step 1206, according to certain non-limiting embodiments of the present technology, the processor 550 may be configured to determine, for each point of the first model 610, the respective distance value therefrom to the second model 611—such as the respective distance value 620 from the given point 622 of the first model 610.

In some non-limiting embodiments of the present technology, the processor 550 may be configured to determine the respective distance value 620 based on a predetermined distance field associated with the second model 611—such as the distance field 702 described above with reference to FIGS. 7 and 8.

However, in other non-limiting embodiments of the present technology, the processor 550 may be configured to determine the respective distance value 620 as a distance from the given point 622 of the first model 610 to the predetermined occlusal plane associated with the upper teeth 13, as described in a co-owned U.S. Pat. No. 11,191,619-B1, entitled "METHODS AND SYSTEMS FOR DETERMINING OCCLUSAL CONTACTS BETWEEN TEETH OF A SUBJECT", issued on Dec. 7, 2021, and the content of which is incorporated herein by reference in its entirety.

The method 1200 thus proceeds to step 1208.

Step 1208: Determining, by the Processor, for Each Point of the First Portion of the 3D Model, a Respective Weight Value At step 1208, according to certain non-limiting embodiments of the present technology, as described above, the processor 550 may be configured to determine a respective weight value for each one of the respective distance values associated with the points of the first model 610 to the second model 611.

In some non-limiting embodiments of the present technology, the processor 550 may be configured to determine the respective weight value for the respective distance value 620 associated with the given point 622 of the first model 610 based on the curvature of the first model 610 thereat.

For example, as described above with reference to FIG. 9, the processor 550 may be configured to reconstruct mesh elements of the first model 610 by joining the points thereof by respective edges, and further determine the curvature of the first model 610 at the given point 622 based on the surface area of the polygon 902 formed by mesh elements of the first model 610 adjacent to the given point 622.

Further, in some non-limiting embodiments of the present technology, the processor 550 may be configured to apply the predetermined coefficient to the surface area of the polygon 902. As noted above, the predetermined coefficient may be ⅓. Thus, in specific non-limiting embodiments of the present technology, the processor 550 may be configured to determine the respective weight value associated with the respective distance value 620 in accordance with Equation (3). However, it should be expressly understood that in other non-limiting embodiments of the present technology, the predetermined coefficient can have other values, such as 0.1, 0.5, 1.2, or 5.0, for example, without departing from the scope of the present technology.

The method 1200 hence advances to step 1210.

Step 1210: Generating, by the Processor, for Each Point of the First Portion of the 3D Model, Based on the Respective Weight Value and the Respective Distance Value Associated Therewith, a Respective Weighted Distance Value At step 1210, according to certain non-limiting embodiments of the present technology, for the given point 622 of the first model, the processor 550 may be configured to determine the respective weighted distance value. For example, as described above, the processor 550 may be configured to determine the respective weighted distance value in accordance with Equation (1).

The method thus proceeds to step 1212.

Step 1212: Aggregating, by the Processor, Respective Weighted Distance Values Associated with Each Point of the First Portion Thereby Determining an Aggregate Distance Value Further, at step 1212, according to certain non-limiting embodiments of the present technology, the processor 550 may be configured to determine the aggregate distance value associated with the first model 610, the aggregate distance value being indicative of the remoteness measure between the first model 610 and the second model 611. Generally speaking, the remoteness measure is indicative of how far the first model 610 from forming the bite position associated with the subject relative to the second model 611.

In some non-limiting embodiments of the present technology, the processor 550 may be configured to determine the aggregate distance value by summing up the respective distance values associated with the points of the first model 610. However, in other non-limiting embodiments of the present technology, the processor 550 may be configured to determine the aggregate distance value by summing the respective weighted distance values associated with the points of the first model 610—that is, in accordance with Equation (2) described above.

The method 1200 thus advances to step 1214.

Step 1214: Determining, by the Processor, the Bite Position Between the Lower Arch Form and the Upper Arch Form Based on the Aggregate Distance Value Associated with the First Portion of the 3D Model At step 1214, according to certain non-limiting embodiments of the present technology, based on the aggregate distance value associated with the first model 610, and using the first model 610 and the second model 611, the processor 550 may be configured to determine the bite position between the lower arch form 10 and the upper arch form 11.

To that end, as mentioned above, in some non-limiting embodiments of the present technology, the processor 550 may be configured to apply the optimization algorithm configured to balance the following conditions: (1) minimizing the aggregate distance value causing displacement of the first model 610 relative to the second model 611; and (2) minimizing a number of overlap occurrences between the first model 610 and the second model 611, until a convergence thereof, thereby determining an optimized position of the first model 610 relative to the second model 611.

As further mentioned above, the displacement of the first model 610 relative to the second model 611, at each iteration of the optimization algorithm, may be caused applying the one or more transformation rules including at least one of (1) translational transformation rule causing a translational movement of the first model 610 relative to the second model 611; and (2) rotational transformation rule causing a rotation movement of the first model 610 relative to the second model 611—that is, as formally expressed by Equation (4), as an example.

Thus, the processor 550 may be configured to apply the optimization algorithm to minimize the aggregate distance value until the optimization algorithm converges, that is, until the aggregate distance value does not exceed the predetermined convergence threshold value, which may be, about 0.5 mm, as an example.

In some non-limiting embodiments of the present technology, the optimization algorithm may comprise at least one of a gradient descent algorithm, a random search algorithm, a genetic algorithm, and a simulated annealing algorithm.

Thus, as described above with reference to FIG. 10, by iteratively applying the optimization algorithm as described above, the processor 550 can be configured to determine the optimized position of the first model 610 relative to the second model 611, which, in accordance with certain non-limiting embodiments of the present technology, is indicative of the bite position of the lower arch form 10 relative to the upper arch form 11.

Further, the processor 550 may be configured to use the first model 610 and the second model 611, thus brought in the bite position, to determine the orthodontic treatment. For example, as described above, the processor 550 may be configured to model tooth movements of at least some of the lower teeth 12 and the upper teeth 13 of the subject to target positions thereof associated with their alignment within the respective one of the lower arch form 10 and the upper arch form 11.

Further, in additional non-limiting embodiments of the present technology, the processor 550 may be configured to display the bite position of the lower teeth 12 and the upper teeth 13. To that end, as described above with reference to FIG. 11, the processor 550 may be configured to generate the depth map representation 1102 indicative of the occlusal contacts between the lower teeth 12 and the upper teeth 13 in the bite position.

The method 1200 thus advances to step 1216.

Step 1216: Storing, by the Processor, Data Indicative of the Bite Position in a Memory Device Communicatively Coupled with the Processor Finally, at step 1216, in additional non-limiting embodiments of the present technology, the processor 550 may be configured to store the depth map representation 1102 in one of the solid-state drive 560 and the random-access memory 570 for further causing display thereof on a display, such as the screen 422. The depth map representation 1102 may be displayed on the screen 422, for example, for examining the bite position between the lower teeth 12 and the upper teeth 13 by the practicing clinician, who may further manually amend the orthodontic treatment determined as described above based on her/his expertise.

Thus, certain embodiments of the method 1200 allow reproducing a more anatomically accurate bite position between the lower teeth 12 and the upper teeth 13 of the subject using independently generated respective 3D models thereof, such as the first model 610 and the second model 611. In this regard, as noted above, the present methods and systems allow for a more accurate modelling of the tooth movements of the subject's teeth when planning orthodontic treatment, which may thus translate in the increased safety and efficiency thereof.

The method 1200 thus terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining a bite position of a lower arch form and an upper arch form of a subject, the method being executable by a processor, the method comprising:
   receiving, by the processor, a 3D model including a first portion and a second portion,
      the first portion including points representative of a surface of the lower arch form of the subject;
      the second portion including points representative of a surface of the upper arch form of the subject;
   determining, by the processor, for each point of the first portion of the 3D model, a respective distance value therefrom to the second portion of the 3D model;
   aggregating, by the processor, respective distance values associated with each point of the first portion thereby determining an aggregate distance value,
      the aggregate distance value being indicative of a remoteness measure of a current position of the first portion of the 3D model from a bite position thereof relative to the second portion of the 3D model; and determining, by the processor, the bite position of the lower arch form and the upper arch form based on the aggregate distance value associated with the first portion of the 3D model;

storing, by the processor, data indicative of the bite position in a memory device communicatively coupled with the processor.

2. The method of claim 1, wherein, prior to the aggregating respective distance values, the method further comprises:

determining, by the processor, for each point of the first portion of the 3D model, a respective weight value, the respective weight value associated with a given point of the first portion of the 3D model being indicative of a curvature of the first portion of the 3D model thereat;

determining, by the processor, for each point of the first portion of the 3D model, based on the respective weight value and the respective distance value associated therewith, a respective weighted distance value; and wherein:

the aggregating respective distance values comprises aggregating, by the processor, respective weighted distance values associated with each point of the first portion.

3. The method of claim 2, wherein the determining the aggregate distance value is executed in accordance with an equation:

$$f_O = \sum_{n=1}^{N} f_P(n),$$

where $f_P(n)$ is the respective weighted distance value associated with the given point of the first portion of the 3D model, and N is a number of points of the first portion.

4. The method of claim 3, wherein the determining the respective weighted distance value is executed in accordance with an equation:

$f_P(n) = D_n W_n,$ where $D_n$ is the respective distance value from the given point of the first portion to the second portion of the 3D model, and $W_n$ is the respective weight value associated with the given point.

5. The method of claim 4, wherein:

the first portion further includes mesh elements defined by edges joining respective ones of the points of the first portion, and the determining the respective weight value comprises determining an area of a polygon formed by mesh elements of the first portion adjacent to the given point thereof.

6. The method of claim 5, wherein the determining the respective weight value is executed in accordance with an equation:

$W_n = \frac{1}{3} A(P_n),$ where $A(P_n)$ is the area of the polygon formed by the mesh elements of the first portion adjacent to the given point thereof.

7. The method of claim 1, wherein the determining the bite position further comprises:

iteratively minimizing, by the processor, based on one or more transformation rules, the aggregate distance value, thereby causing displacement of the first portion from the current position thereof towards an optimized position thereof such that a number of overlap occurrences between the first portion and the second portion of the 3D model is minimized; and determining, by the processor, the bite position between the lower arch form and the upper arch form of the subject as being the optimized position of the first portion relative to the second portion of the 3D model.

8. The method of claim 7, wherein the one or more transformation rules include at least one of a translation transformation and a rotation transformation.

9. The method of claim 7, wherein the iteratively minimizing the aggregate distance value includes applying, by the processor, an optimization algorithm.

10. The method of claim 9, wherein the optimization algorithm includes at least one of a gradient descent algorithm, a random search algorithm, a genetic algorithm, and a simulated annealing algorithm.

11. The method of claim 1, wherein the determining, for each point of the first portion of the 3D model, the respective distance value includes determining, by the processor, a distance field associated with the second portion of the 3D model.

12. The method of claim 1, further comprising:

mapping the respective distance values from the points of the first portion to the second portion of the 3D model at the bite position thereof on portions of at least one of the first portion and the second portion of the 3D model representative of occlusal surfaces of a respective one of the lower arch form and the upper arch form, thereby generating a depth map representation of the bite position between the lower arch form and the upper arch form;

causing, by the processor, display of the depth map representation of the bite position between the lower arch form and the upper arch form on the at least one of the first portion and the second portion.

13. The method of claim 1, further comprising determining, by the processor, an orthodontic treatment for the subject based on the data indicative of the bite position.

14. A system for determining a bite position between a lower arch form and an upper arch form of a subject, the system including:

a processor, a memory device storing instructions, the processor, upon executing the instructions, being configured to:

receive a 3D model including a first portion and a second portion, the first portion including points representative of a surface of the lower arch form of the subject;

the second portion including points representative of a surface of the upper arch form of the subject;

determine, for each point of the first portion of the 3D model, a respective distance value therefrom to the second portion of the 3D model;

aggregate respective distance values associated with each point of the first portion thereby determining an aggregate distance value, the aggregate distance value being indicative of a remoteness measure of a current position of the first portion of the 3D model from a bite position thereof relative to the second portion of the 3D model; and determine the bite position of the lower arch form and the upper arch form based on the aggregate distance value associated with the first portion of the 3D model;

store data indicative of the bite position in a memory device communicatively coupled with the processor.

15. The system of claim 14, wherein, prior to aggregating respective distance values, the processor is further configured to:
determine, for each point of the first portion of the 3D model, a respective weight value,
the respective weight value associated with a given point of the first portion of the 3D model being indicative of a curvature of the first portion of the 3D model thereat;
determine, for each point of the first portion of the 3D model, based on the respective weight value and the respective distance value associated therewith, a respective weighted distance value; and wherein:
to determine the aggregate distance value, the processor is configured to aggregate respective weighted distance values associated with each point of the first portion.

16. The system of claim 15, wherein the processor is configured to determine the aggregate distance value in accordance with an equation:

$$f_O = \sum_{n=1}^{N} f_P(n),$$

where $f_P(n)$ is the respective weighted distance value associated with the given point of the first portion of the 3D model, and
N is a number of points of the first portion.

17. The system of claim 16, wherein the processor is configured to determine the respective weighted distance value in accordance with an equation:

$$f_P(n) = D_n W_n,$$

where $D_n$ is the respective distance value from the given point of the first portion to the second portion of the 3D model, and
$W_n$ is the respective weight value associated with the given point.

18. The system of claim 17, wherein:
the first portion further includes mesh elements defined by edges joining respective ones of the points of the first portion, and
the processor is further configured to determine the respective weight value in accordance with an equation:

$$W_n = \tfrac{1}{3} A(P_n),$$

where $A(P_n)$ is an area of a polygon formed by mesh elements of the first portion adjacent to the given point thereof.

19. The system of claim 14, wherein to determine the bite position, the processor is further configured to:
iteratively minimize, based on one or more transformation rules, the aggregate distance value, thereby causing displacement of the first portion from the current position thereof towards an optimized position thereof such that a number of overlap occurrences between the first portion and the second portion of the 3D model is minimized; and
determine the bite position between the lower arch form and the upper arch form of the subject as being the optimized position of the first portion relative to the second portion of the 3D model.

20. The system of claim 19, wherein to iteratively minimize the aggregate distance value, the processor is further configured to apply an optimization algorithm.

* * * * *